US012123205B2

(12) United States Patent
Telleria et al.

(10) Patent No.: US 12,123,205 B2
(45) Date of Patent: *Oct. 22, 2024

(54) AUTOMATED DRYWALL PLANNING SYSTEM AND METHOD

(71) Applicant: Canvas Construction, Inc., San Francisco, CA (US)

(72) Inventors: Maria J. Telleria, Redwood City, CA (US); Gabriel F. Hein, Albany, CA (US); Kevin B. Albert, San Francisco, CA (US); Thomas F. Allen, Oakland, CA (US); Charlie Yan, San Francisco, CA (US)

(73) Assignee: Canvas Construction, Inc., San Francisco, CA (US)

( * ) Notice: Subject to any disclaimer, the term of this patent is extended or adjusted under 35 U.S.C. 154(b) by 39 days.

This patent is subject to a terminal disclaimer.

(21) Appl. No.: 17/981,777

(22) Filed: Nov. 7, 2022

(65) Prior Publication Data

US 2023/0055480 A1 Feb. 23, 2023

Related U.S. Application Data

(63) Continuation of application No. 16/589,501, filed on Oct. 1, 2019, now Pat. No. 11,525,270, which is a (Continued)

(51) Int. Cl.
*E04F 21/02* (2006.01)
*B05B 1/28* (2006.01)
(Continued)

(52) U.S. Cl.
CPC .............. *E04F 21/026* (2013.01); *B05B 1/28* (2013.01); *B05B 7/0093* (2013.01); *B05B 9/007* (2013.01);
(Continued)

(58) Field of Classification Search
None
See application file for complete search history.

(56) References Cited

U.S. PATENT DOCUMENTS 5,279,700 A * 1/1994 Retti ..................... E04F 21/165
                                                               118/679
6,712,238 B1 * 3/2004 Mills ................... E04F 21/1657
                                                               222/61

(Continued)

FOREIGN PATENT DOCUMENTS

JP        5107123       12/2012
JP      2020056277      4/2020

OTHER PUBLICATIONS

Forsberg, "A Construction Robot for Autonomous Plastering of Walls and Ceilings", 1997, Lulea Univ. of Technology, pp. 1-9 (Year: 1997).*

(Continued)

*Primary Examiner* — David Earl Ogg
(74) *Attorney, Agent, or Firm* — Akona IP PC

(57) ABSTRACT

An automated drywalling system network that including one or more automated drywalling systems that each has a robotic arm. The automated drywalling system network can also include a computational planner that generates instructions for the one or more automated drywalling systems to perform two or more drywalling tasks associated with a target wall assembly. The two or more drywalling tasks can include a hanging task that includes hanging pieces of drywall on studs of the target wall assembly; a mudding task that includes applying joint compound to pieces of drywall hung on studs of the target wall assembly; a sanding task that includes sanding joint compound applied to the pieces of drywall hung on studs of the target wall assembly; and a painting task that includes painting sanded the joint com- (Continued)

pound applied to the pieces of drywall hung on studs of the target wall assembly.

20 Claims, 11 Drawing Sheets

Related U.S. Application Data continuation of application No. 15/942,158, filed on Mar. 30, 2018, now Pat. No. 10,513,856.

(60) Provisional application No. 62/480,172, filed on Mar. 31, 2017.

(51) Int. Cl.

| | | |
|---|---|---|
| *B05B 7/00* | (2006.01) | |
| *B05B 9/00* | (2006.01) | |
| *B05B 12/12* | (2006.01) | |
| *B05B 13/04* | (2006.01) | |
| *B05B 15/625* | (2018.01) | |
| *B05C 5/00* | (2006.01) | |
| *B05C 5/02* | (2006.01) | |
| *B05C 11/10* | (2006.01) | |
| *B05D 1/02* | (2006.01) | |
| *B05D 3/04* | (2006.01) | |
| *B05D 3/06* | (2006.01) | |
| *B24B 7/18* | (2006.01) | |
| *B24B 49/12* | (2006.01) | |
| *B24B 55/06* | (2006.01) | |
| *B24B 55/10* | (2006.01) | |
| *B25J 9/16* | (2006.01) | |
| *B25J 11/00* | (2006.01) | |
| *B25J 15/00* | (2006.01) | |
| *B26D 5/00* | (2006.01) | |
| *E04B 1/76* | (2006.01) | |
| *E04F 21/00* | (2006.01) | |
| *E04F 21/08* | (2006.01) | |
| *E04F 21/12* | (2006.01) | |
| *E04F 21/16* | (2006.01) | |
| *E04F 21/165* | (2006.01) | |
| *E04F 21/18* | (2006.01) | |
| *B05B 7/24* | (2006.01) | |
| *B05B 7/26* | (2006.01) | |
| *B05B 9/01* | (2006.01) | |
| *B05B 14/00* | (2018.01) | |
| *B05C 3/18* | (2006.01) | |
| *B25J 9/00* | (2006.01) | |
| *B26D 3/08* | (2006.01) | |

(52) U.S. Cl.
CPC ........ *B05B 12/122* (2013.01); *B05B 13/0431* (2013.01); *B05B 15/625* (2018.02); *B05C 5/004* (2013.01); *B05C 5/02* (2013.01); *B05C 11/1039* (2013.01); *B05D 1/02* (2013.01); *B05D 3/0413* (2013.01); *B05D 3/067* (2013.01); *B24B 7/182* (2013.01); *B24B 49/12* (2013.01); *B24B 55/06* (2013.01); *B24B 55/10* (2013.01); *B25J 9/1661* (2013.01); *B25J 9/1697* (2013.01); *B25J 11/0055* (2013.01); *B25J 11/0075* (2013.01); *B25J 15/0019* (2013.01); *B26D 5/007* (2013.01); *E04B 1/7654* (2013.01); *E04F 21/0046* (2013.01); *E04F 21/08* (2013.01); *E04F 21/085* (2013.01); *E04F 21/12* (2013.01); *E04F 21/16* (2013.01); *E04F 21/165* (2013.01); *E04F 21/1652* (2013.01); *E04F 21/1657* (2013.01); *E04F 21/18* (2013.01); *B05B 7/24* (2013.01); *B05B 7/26* (2013.01); *B05B 9/01* (2013.01); *B05B 14/00* (2018.02); *B05C 3/18* (2013.01); *B25J 9/0084* (2013.01); *B26D 3/085* (2013.01); *G05B 2219/40114* (2013.01); *G05B 2219/40298* (2013.01); *Y10S 901/01* (2013.01); *Y10S 901/41* (2013.01); *Y10S 901/43* (2013.01); *Y10S 901/47* (2013.01)

(56) References Cited

U.S. PATENT DOCUMENTS

| | | | | |
|---|---|---|---|---|
| 2011/0282492 | A1* | 11/2011 | Krause | B25J 9/1664 901/47 |
| 2012/0316930 | A1* | 12/2012 | Clemenson | G06Q 10/06 705/7.11 |
| 2014/0336818 | A1* | 11/2014 | Posselius | G05D 1/0297 700/248 |
| 2016/0121486 | A1* | 5/2016 | Lipinski | B05B 13/0405 427/427.3 |
| 2017/0114553 | A1* | 4/2017 | Raman | B25J 9/1676 |
| 2019/0118209 | A1* | 4/2019 | Rennuit | B25J 13/06 |

OTHER PUBLICATIONS

Extended European Search Report issued in EP Patent Application No. 18774804.1, dated Dec. 4, 2020, 6 pages.
EN machine translation of JP2020056277 from Google Patents.
EN machine translation of JP5107123 from Google Patents.

\* cited by examiner

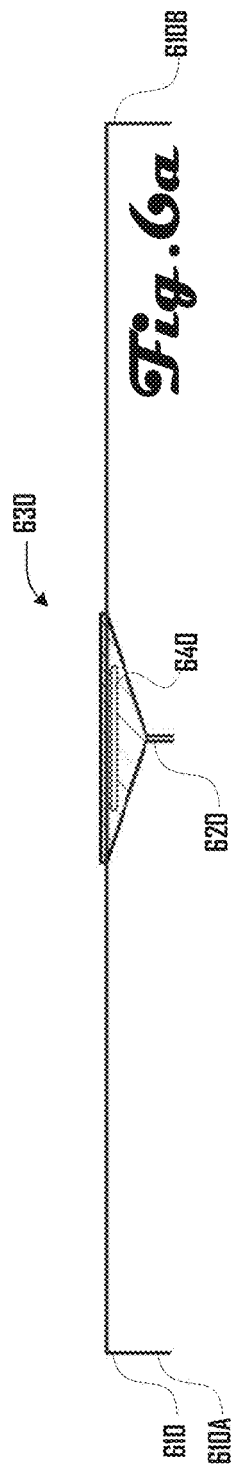
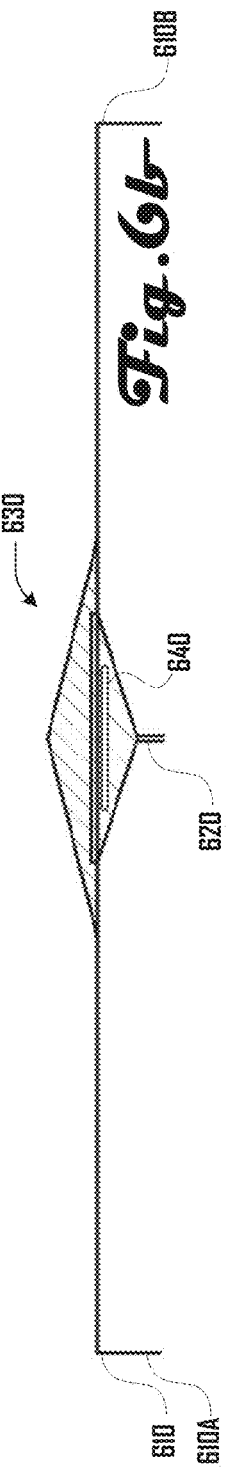
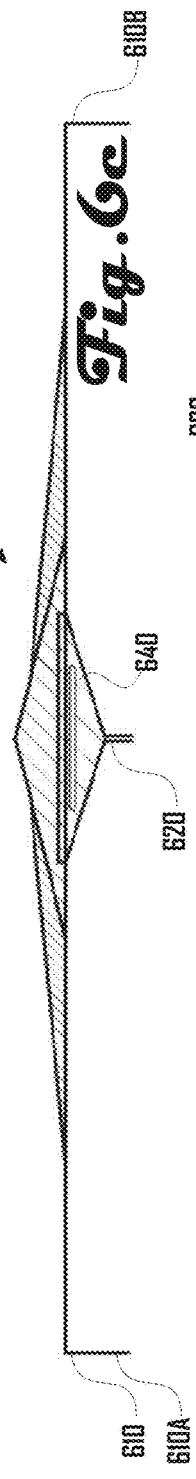
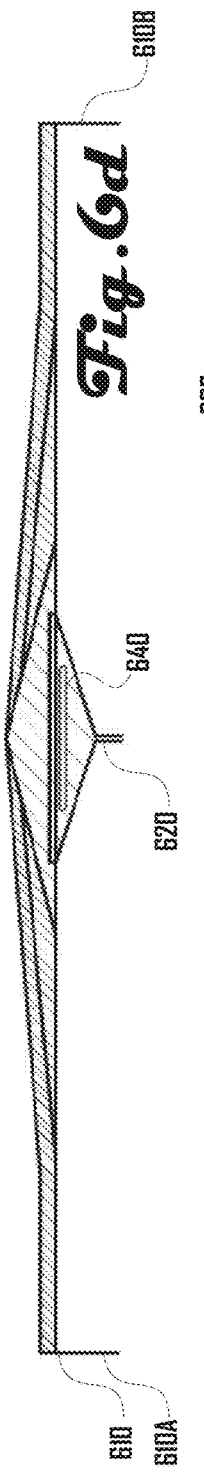
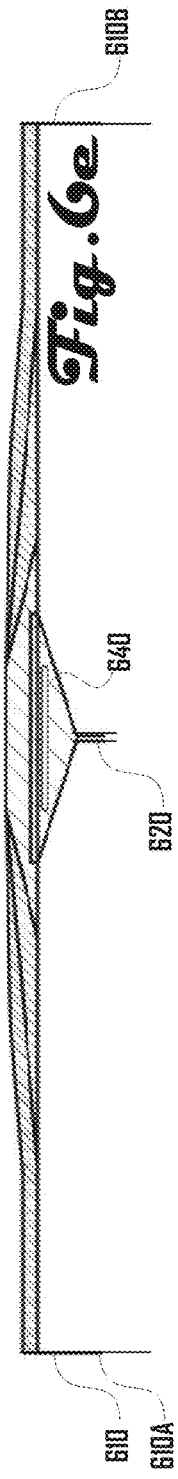

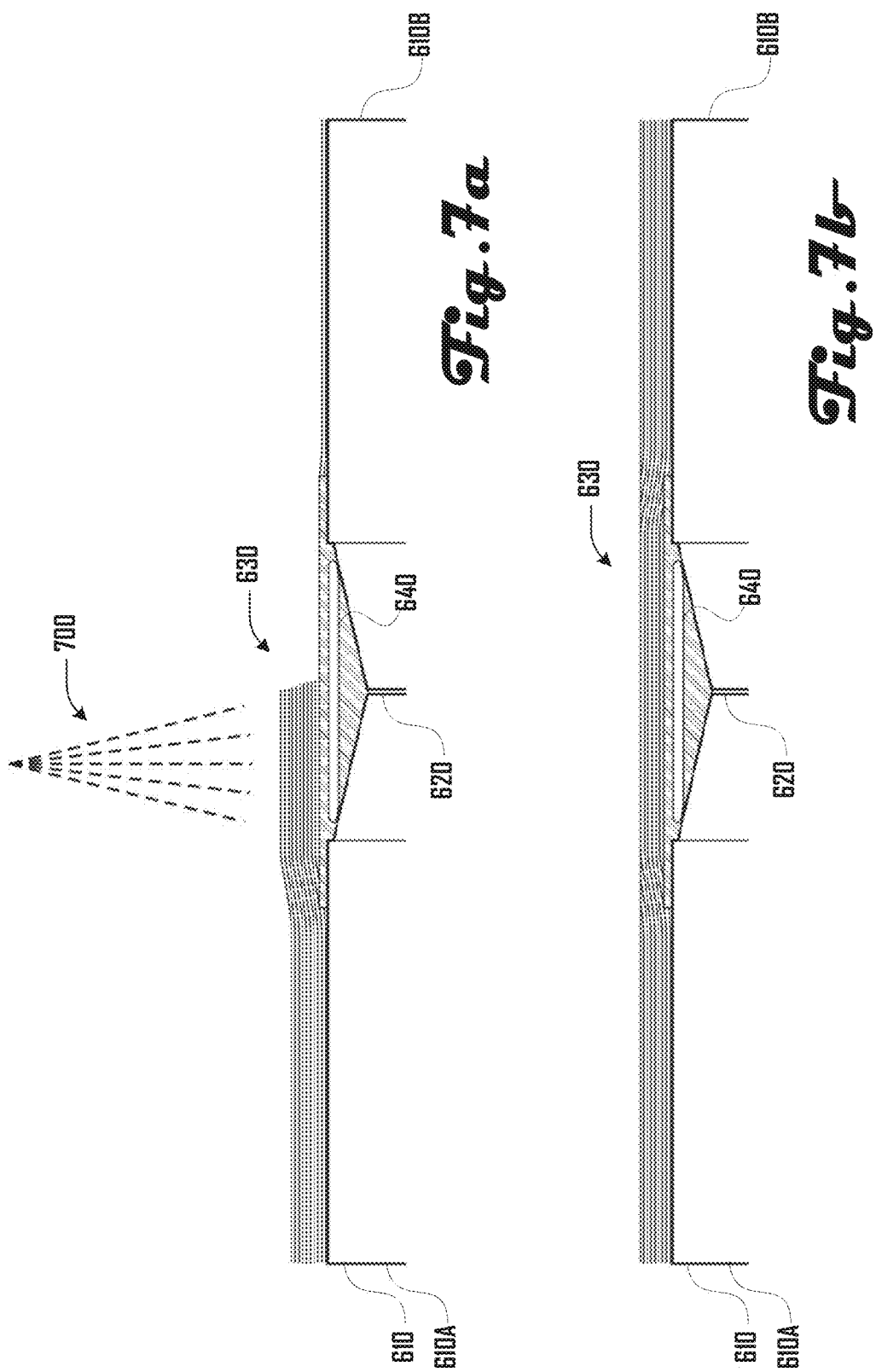

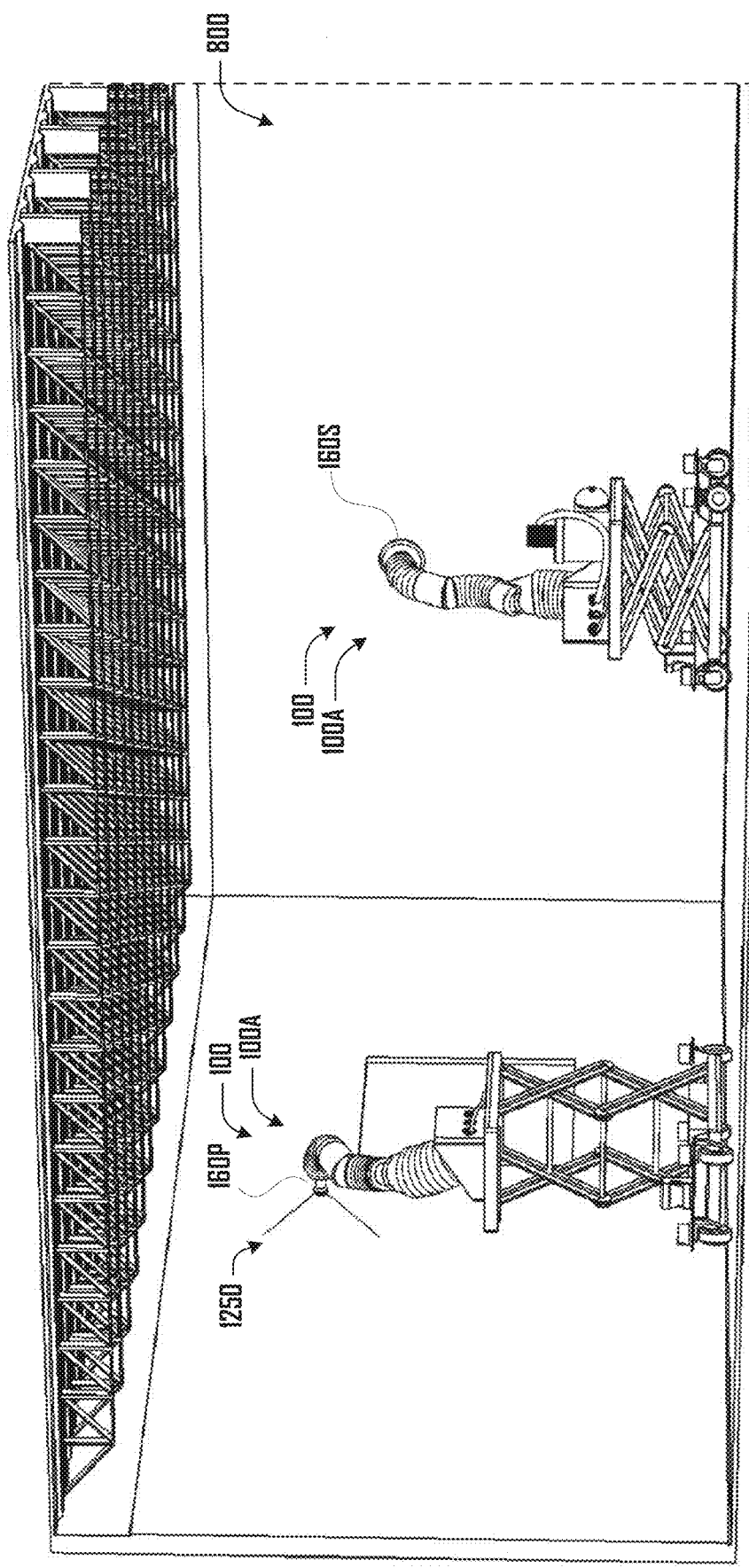

AUTOMATED DRYWALL PLANNING SYSTEM AND METHOD

CROSS-REFERENCE TO RELATED APPLICATIONS

This application is a continuation of U.S. application Ser. No. 16/589,501, filed Oct. 1, 2019, which is a continuation of U.S. application Ser. No. 15/942,158, filed Mar. 30, 2018, which is a non-provisional of, and claims the benefit of U.S. Provisional Application No. 62/480,172, filed Mar. 31, 2017, which applications are hereby incorporated herein by reference in their entirety and for all purposes.

This application is also related to U.S. Non-provisional applications filed contemporaneously with U.S. application Ser. No. 15/942,158, application Ser. Nos. 15/942,193, 15/941,886, 15/942,318, 15/942,087, 15/942,286, and 15/941,974 and respectively entitled "AUTOMATED DRYWALL CUTTING AND HANGING SYSTEM AND METHOD," "AUTOMATED DRYWALL MUDDING SYSTEM AND METHOD," "AUTOMATED DRYWALL SANDING SYSTEM AND METHOD," "AUTOMATED DRYWALL PAINTING SYSTEM AND METHOD," "AUTOMATED DRYWALLING SYSTEM AND METHOD," and "AUTOMATED INSULATION APPLICATION SYSTEM AND METHOD." These applications are hereby incorporated herein by reference in their entirety and for all purposes.

BRIEF DESCRIPTION OF THE DRAWINGS

FIGS. 6a, 6b, 6c, 6d and 6e illustrate an embodiment of a manual mud application profile, where joint compound is applied over consecutive layers to taper out high points over a wider area and where sanding is then used to smooth out the final profile.

FIGS. 7a and 7b illustrate an embodiment of an automated compound application process where the joint compound is applied in a thick layer using a sprayer.

FIG. 11 illustrates another embodiment of a drywalling system comprising a first automated drywalling system painting and a second automated drywalling system performing sanding.

Figure 1:
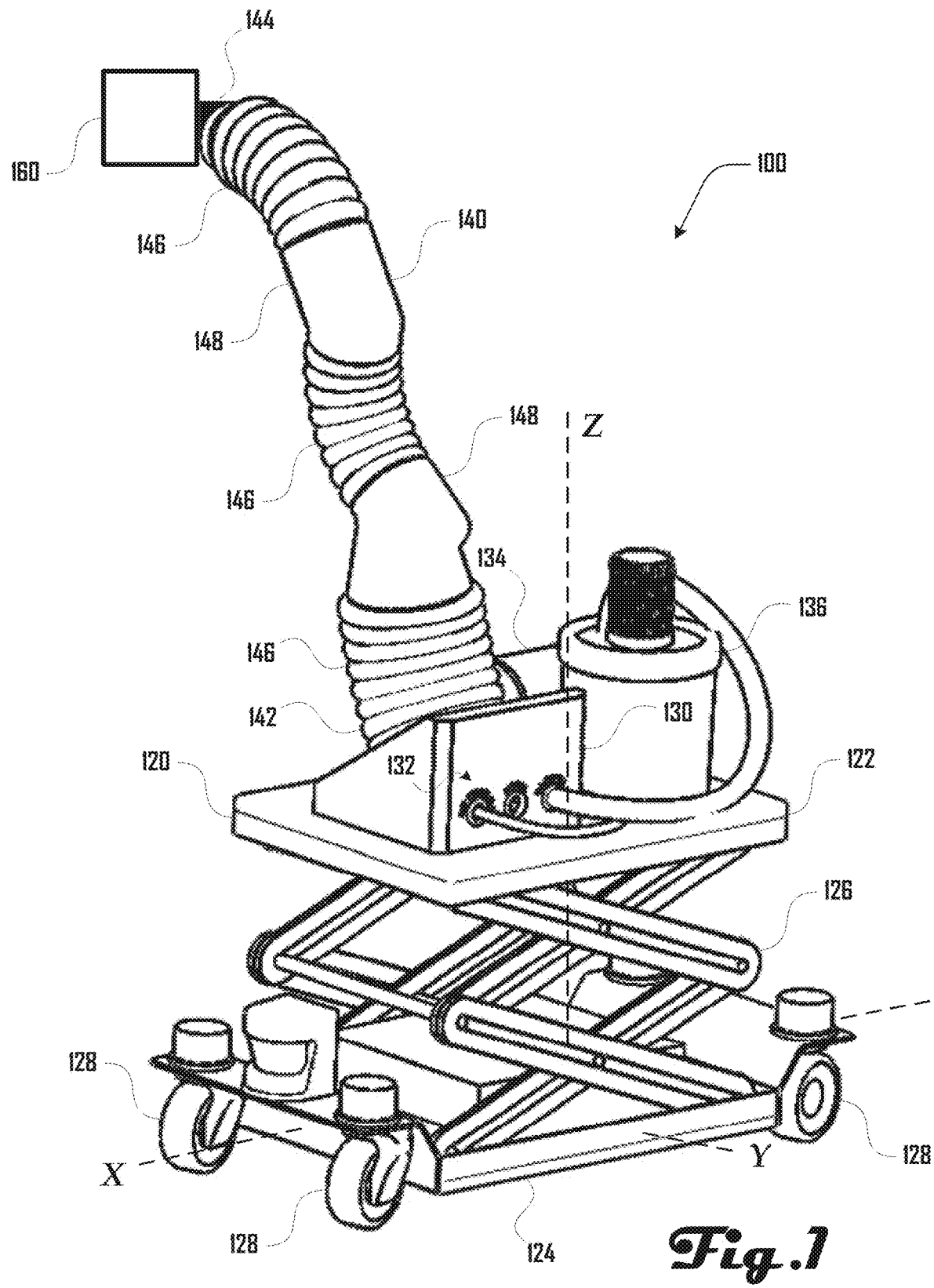
FIG. 1 is an exemplary perspective drawing illustrating an embodiment of an automated drywall installation system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

The following disclosure pertains to an automated drywalling system, which in some embodiments can be used for drywalling, including one or more of planning a configuration and location of drywall pieces on a wall assembly, cutting drywall pieces, hanging drywall pieces, performing mud work on hung drywall pieces, performing sanding on mudded drywall pieces and painting sanded drywall pieces.

One aspect pertains to a computational planner that can be used to optimize an automated process for installing and finishing drywall. The planner can be used to control and create plans for an automated drywall hanging and finishing system that can include a mobile base, robotic arm, end effectors tools, lift, gantry, positioning stage, or any combination of these. The process of installing and finishing drywall can include, but is not limited to, optimizing the layout of drywall boards to cover a wall, surface, or ceiling, planning toolpaths for cutting or marking the boards for cutting to fit the prescribed layout, creating a plan to work alongside or assist an operator with a robotic arm, lift, positioning stage, mobile base, end effector, tools, or any combination of these in the hanging of the drywall.

A planner can also be used to create toolpaths, tool parameters and machine paths for applying joint compound onto the drywall boards for finishing. The planner can optimize the mud application to address board joints, low or high spots, screws, anchors or any other defects in order to achieve the desired visually flat surface. The computational planner can also plan toolpaths and set tool parameters to sand the drywall compound and for painting or coating the sanded drywall. The planner can use information and maps from any of the previous and subsequent steps to determine the optimal process specifications for any given step.

Figure 2:
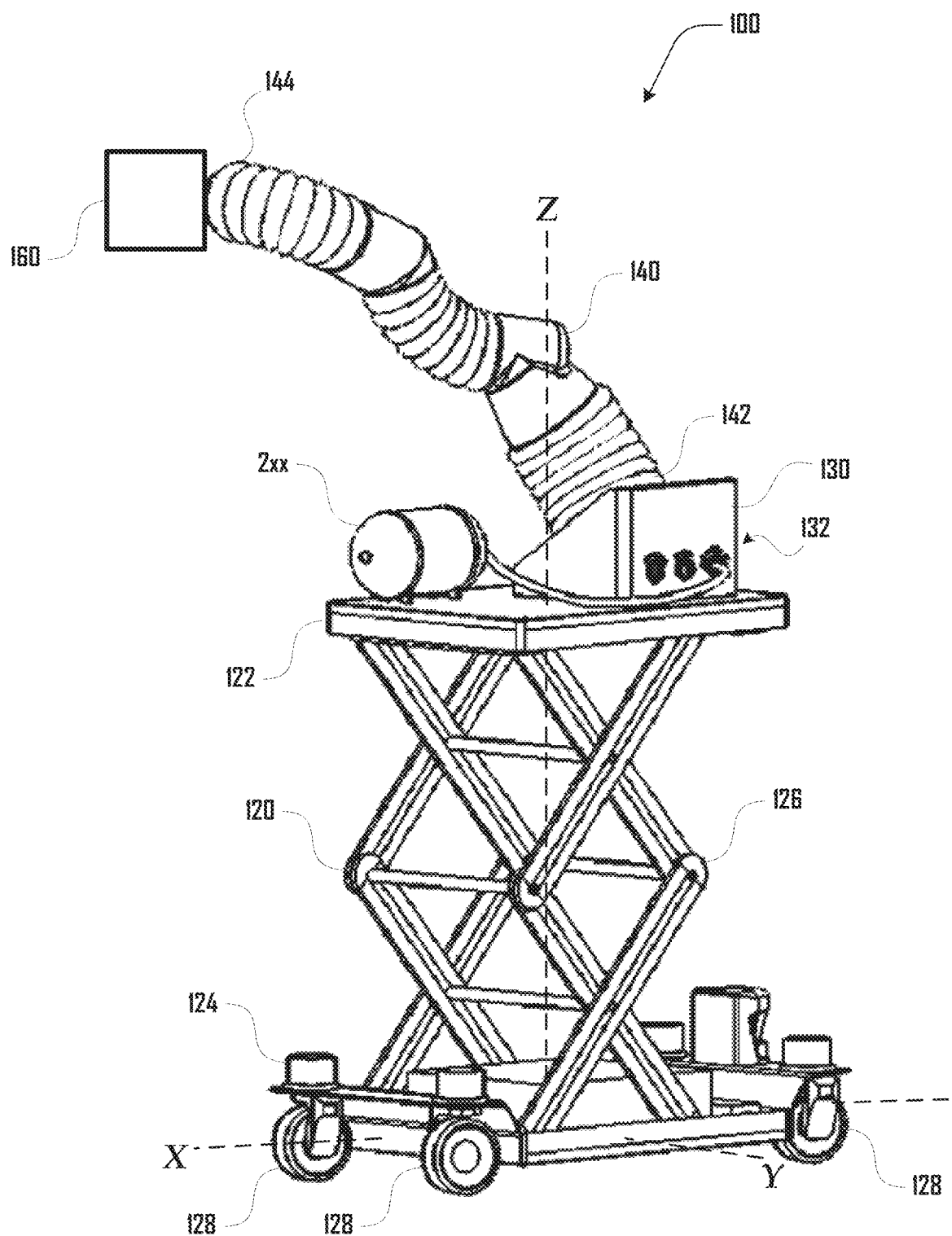
FIG. 2 is an exemplary perspective drawing illustrating another embodiment of an automated drywalling system.

Turning to FIGS. 1 and 2, examples of an automated drywalling system 100 are illustrated, which includes a base unit 120, a robotic arm 140 and an end effector 160. The base unit 120 comprises a platform 122 and a cart 124 with a lift 126 disposed between the platform 122 and cart 124. The cart 124 can be configured to be disposed on the ground and move within an XY plane defined by axes X and Y, and the lift 126 can be configured to raise the platform 122 up and down along axis Z, which is perpendicular to axes X and Y.

In the examples of FIGS. 1 and 2, the cart 124 can comprise a plurality of wheels 128, which can be used to move the cart 124 and drywalling system 100 on the ground in the XY plane. Such movement can be motorized or can be non-motorized. For example, in some embodiments, the drywalling system 100 can be configured for automated movement of the cart 124, motorized movement based on input from a user and/or non-motorized movement based on physical movement by a user. Additionally, while an example having wheels 128 is shown in some examples herein, it should be clear that the cart 124 can be configured for motorized and/or non-motorized movement via any suitable structures, systems, or the like.

In the examples of FIGS. 1 and 2, the lift 126 is shown comprising a scissor lift that can raise and lower the platform 122 relative to the cart 124 along axis Z. Such movement can be motorized or can be non-motorized. For example, in some embodiments, the drywalling system 100 can be configured for automated movement of the lift 126, motorized movement of the lift 126 based on input from a user and/or non-motorized movement based on physical operation of the lift 126 by a user. Additionally, while an example of a scissor lift is shown herein, it should be clear that any suitable lift system can comprise the lift 126 without limitation.

The platform 122 can comprise a hub 130, which can couple with the robotic arm 140 at a base end 142 of the robotic arm 140. The hub 130 can comprise an input interface 132 that allows for various systems to couple with the hub 130, which can allow for resources provided by such systems to be provided to the robotic arm 140 and/or the end effector 160 coupled at a distal end 144 of the robotic arm 140 as discussed in more detail herein. For example, a pneumatic source, a power source, a vacuum source, a paint source, a mud or joint compound source, or the like can be coupled to the hub 130. FIG. 1 illustrates an example having an air compressor 134 and a vacuum source 136 coupled to the hub 130. FIG. 2 illustrates an example having an air compressor 134 coupled to the hub 130, which can be used to power pneumatic actuators 146 of the robotic arm 140 and/or provide compressed air to the end effector 160 at the distal end 144 of the robotic arm 140.

In various embodiments, the robotic arm 140 can comprise any suitable robotic arm system, which can include pneumatic actuators, electric actuators, and the like. The robotic arm 140 can have any suitable number of degrees of freedom. Although the examples of FIGS. 1 and 2, illustrate an example having pneumatic actuator units 146 separated by arm couplers 148, this example configuration should not be construed to be limiting on the wide variety of robotic arms 140 that are within the scope and spirit of the present disclosure.

As discussed in more detail herein, an end effector 160 can be coupled at the distal end 144 of the robotic arm 140. In some examples, the automated drywalling system 100 can comprise modular and/or multi-use end effectors 160, which can be configured for various drywalling, construction, or other tasks. For example, as discussed herein, end effectors 160 can be configured for drywall planning, drywall hanging, applying mud or joint compound to hung drywall, sanding mudded drywall, painting, and the like. Although various examples herein relate to drywalling and construction, further embodiments of the drywalling system 100 can be configured for any suitable tasks, including construction tasks, manufacturing tasks, gardening tasks, farming tasks, domestic tasks, and the like. Accordingly, the discussions herein related to drywalling and construction should not be construed to be limiting on the wide variety of tasks that the system 100 can be configured for.

Figure 3:
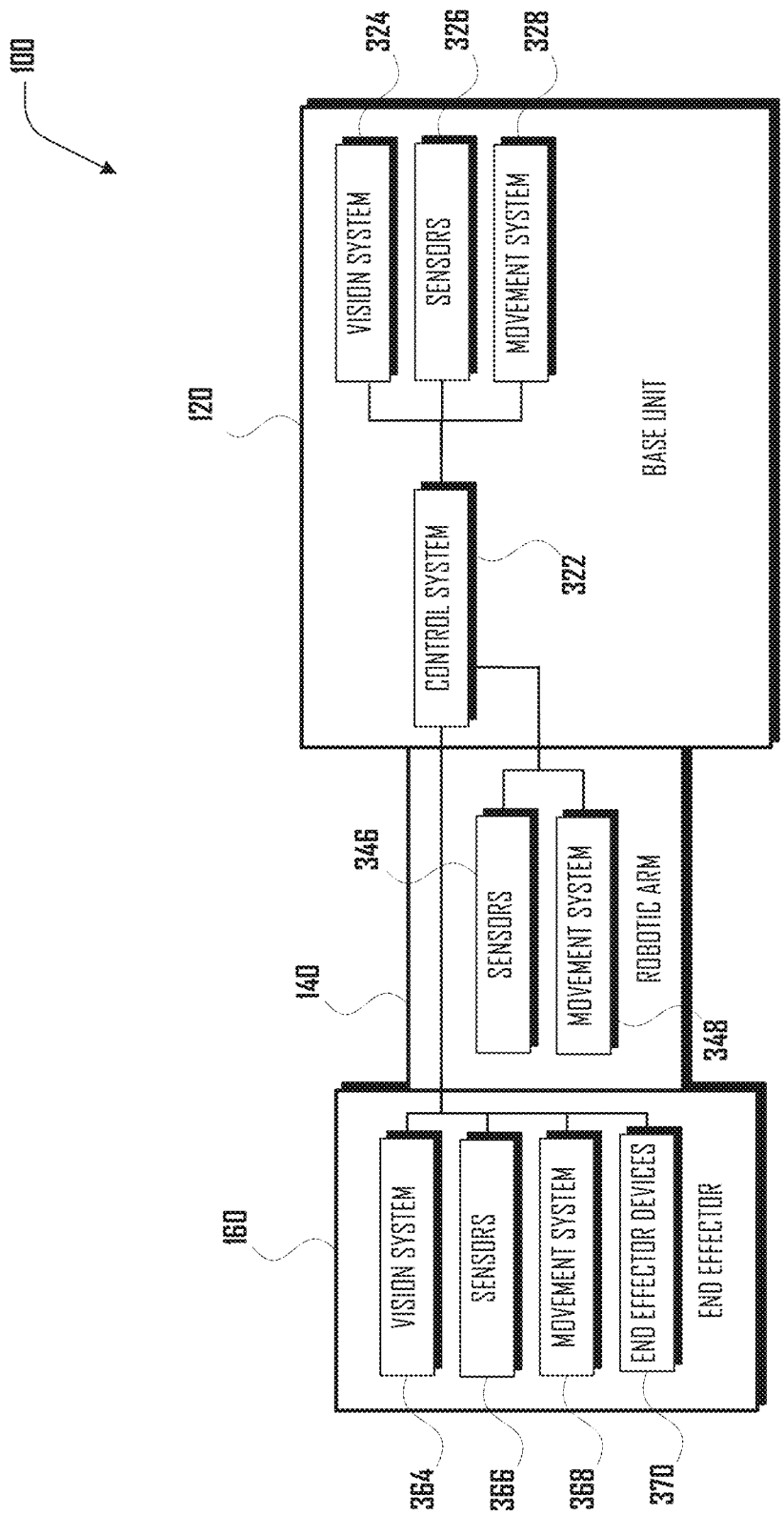
FIG. 3 is an exemplary block diagram illustrating systems of an automated drywalling system in accordance with one embodiment.

Turning to FIG. 3, a block diagram of a drywalling system 100 is illustrated, which includes a base unit 120 coupled to a robotic arm 140, which is coupled to an end effector 160. The base unit 120 is shown comprising a control system 322, which is operably coupled to a vision system 324, sensors 326, and a movement system 328. The robotic arm 140 is shown comprising sensors 346 and a movement system 348, which are operably coupled to the control system 322. The example end effector 160 is shown comprising a vision system 364, sensors 366, a movement system 368, and one or more end effector devices 370, which are operably connected to the control system 322.

In various embodiments, the connections between the control system 322 and respective vision systems 324, 364; respective sensors 326, 346, 366; respective movement systems 328, 348, 368; and end effector devices 370 can comprise any suitable type of connection including wired and/or wireless connections. For example, such connections can be configured for digital and/or analog communication of information between respective elements.

The vision systems 324, 364 can comprise one or more suitable vision system including one or more visible spectrum camera, radar, light detection and ranging (LIDAR) system, sonar, infrared camera, thermal camera, stereo cameras, structured light camera, laser scanners, and the like. The vision systems 324, 364 can comprise the same or different elements. Additionally, in some embodiments, one or both of the vision systems 324, 364 can be absent. In some embodiment, the robotic arm 140 can comprise a vision system.

The sensors 326, 346, 366 can comprise any suitable sensors in various embodiments including one or more sensors of humidity, temperature, air flow, laser curtains, proximity sensors, force and torque sensors, pressure sensors, limit switches, rotameter, spring and piston flow meter, ultrasonic flow meter, turbine meter, paddlewheel meter, variable area meter, positive displacement, vortex meter, pitot tube or differential pressure meters, magnetic meters, humidity sensor, conductivity sensor and depth or thickness sensors. The sensors 326, 346, 366 can comprise the same or different elements. Additionally, in some embodiments, one or more of the sensors 326, 346, 366 can be absent.

The movement systems 328, 348, 368 can comprise any suitable movement systems in various embodiments including one or more of an electric motor, pneumatic actuators, piezo electric actuator, and the like. For example, in some embodiments the movement system 328 of the base unit 120 can comprise the lift 126 and motors that drive wheels 128 of the cart 124 (see FIGS. 1 and 2). In another example, the movement system 348 of the robotic arm 140 can comprise pneumatic actuators 146 as illustrated in the examples of FIGS. 1 and 2. In various embodiments, the movement system 368 of the end effector 160 can comprise motors or other systems that are configured to move, change the orientation of, rotate, or otherwise configure the end effector 160. In some embodiments, one or more of the movement systems 328, 348, 368 can be absent.

As discussed herein, the one or more end effector devices 370 can comprise various suitable devices, including a cutting device, hanging device, mudding device, sanding device, painting device, vacuum device, and the like. Other suitable devices can be part of an end effector 160 and can be selected based on any desired task that the end effector 160 can be used for.

As discussed in more detail herein, the control system 322 can receive data from the vision systems 324, 364 and/or sensors 326, 346, 366 can drive the movement systems 328, 348, 368 and one or more end effector devices 370 to perform various tasks including drywall planning, drywall hanging, applying mud or joint compound to hung drywall, sanding mudded drywall, painting, and the like. Accordingly, the control system 322 can drive the drywalling system 100 to perform various suitable tasks, with some or all portions of such tasks being automated and performed with or without user interaction. The control system can comprise various suitable computing systems, including one or more processor and one or more memory storing instructions that if executed by the one or more processer, provide for the execution of tasks by the automated drywalling system 100 as discussed in detail herein. Additionally, while a control system 322 is shown as being part of the base unit 120, in further embodiments, the control system can be part of the robotic arm 140 or end effector 160. Also, further examples can include a plurality of control systems and/or control sub-systems, which can be suitably disposed in one or more of the base unit 120, robotic arm 140, and/or end effector 160.

Figure 4:
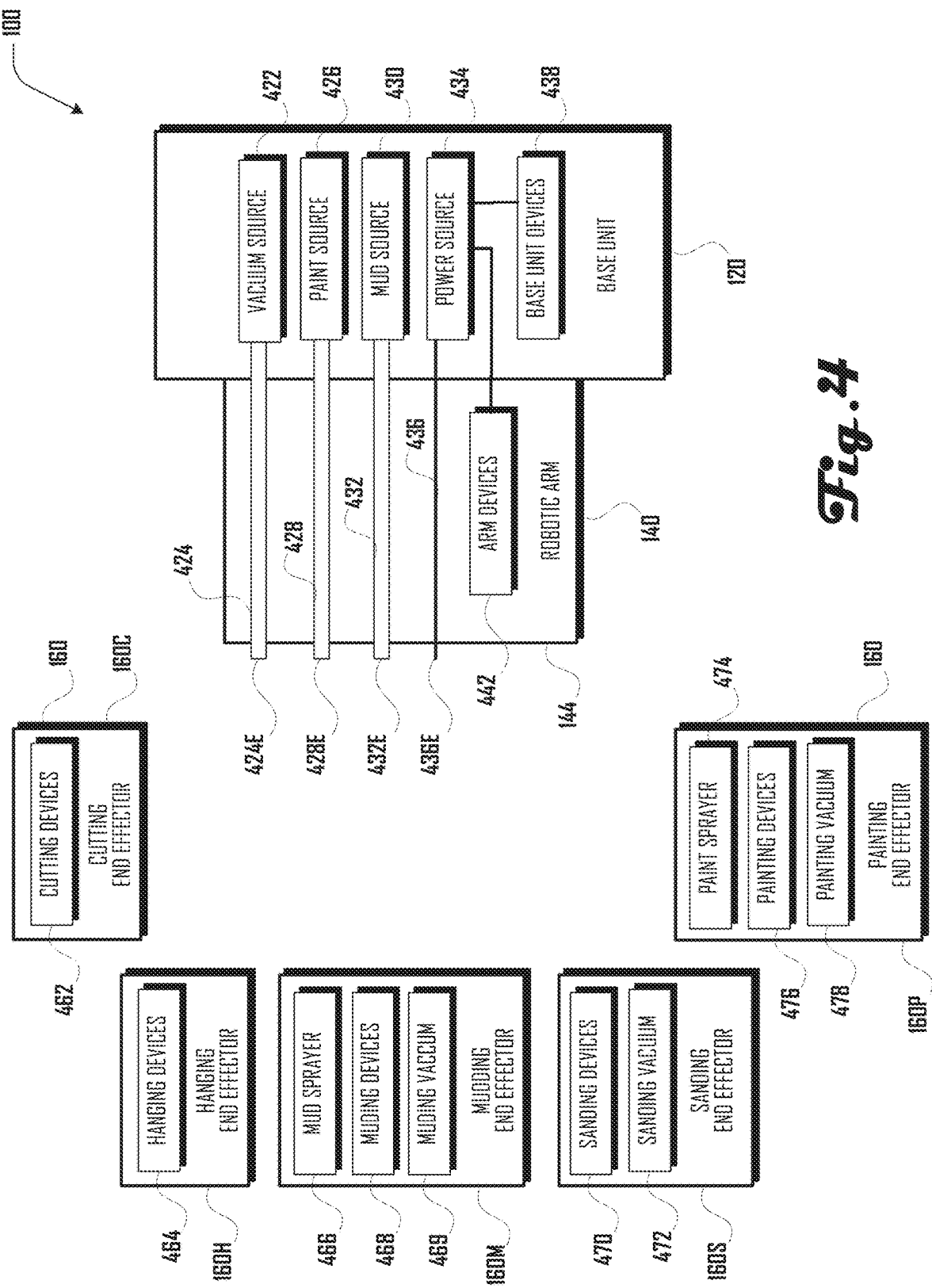
FIG. 4 is an exemplary block diagram illustrating systems of an automated drywalling system in accordance with one embodiment, including a plurality of end effectors configured to couple to an end of a robotic arm.

Turning to FIG. 4, an exemplary block diagram illustrating systems of an automated drywalling system 100 that includes a base unit 120 coupled to a robotic arm 140 and including a plurality of end effectors 160 configured to couple to the distal end 144 of the robotic arm 140. In this example, the end effectors 160 include a cutting end effector 160C, a hanging end effector 160H, a mudding end effector 160M, a sanding end effector 160S and a painting end effector 160P.

As shown in FIG. 4, the base unit 120 can comprise a vacuum source 422, a paint source 426, a mud source 430, a power source 432, and one or more base unit devices 438. In various embodiments, one or more of the vacuum source 422, paint source 426, mud source 430, and power source 432 can couple with a hub 130 (FIGS. 1 and 2) and provide resources to an end effector 160 coupled at the distal end 144 of the robotic arm 140 and/or to the robotic arm 140. For example, the vacuum source 422 can be coupled with a vacuum tube 424 that extends via the robotic arm 140 to an end 424E, which can couple with an end effector 160 as discussed herein. The paint source 426 can be coupled with a paint tube 432 that extends via the robotic arm 140 to an end 432E, which can couple with an end effector 160 as discussed herein. The mud source 430 can be coupled with a mud tube 432 that extends via the robotic arm 140 to an end 432E, which can couple with an end effector 160 as discussed herein.

The power source 434 can be coupled with a power line 436 that extends via the robotic arm 140 to an end 436E, which can couple with an end effector 160 as discussed herein. Additionally, the power source 434 can provide power to arm devices 442 of the robotic arm 140 (e.g., sensors 346 and movement system 348) and to base unit devices 438 of the base unit 120 (e.g., control system 322, vision system 324, sensors 326 and movement system 328). In various embodiments, the power source can comprise one or more batteries and/or can be configured to plug into wall receptacles at a work site. For example, a power cord can be coupled to the power source 438, which allow the drywalling system 100 to be powered by local power at a worksite via a wall receptacle, generator, external batters, or the like. However, in some embodiments, the automated drywalling system 100 can be completely self-powered and can be configured to operate without external power sources at a worksite. In further embodiments, the robotic arm 140 and/or end effectors 160 can comprise a separate power source that can be separate from the power source 438 of the base unit.

In various embodiments, the automated drywalling system 100 can be configured to perform a plurality of tasks related to installing and finishing drywall in construction. In such embodiments, it can be desirable to have a base unit 120 and robotic arm 140 that can couple with and operate a plurality of different end effectors 160 to perform one or more tasks or portions of tasks related to drywalling. For example, the cutting end effector 160C, hanging end effector 160H, mudding end effector 160M, sanding end effector 160S and painting end effector 160P can be selectively coupled with the robotic arm 140 at the distal end 144 to perform respective tasks or portions of tasks related to drywalling.

For example, the cutting end effector 160C can be coupled at the distal end 144 of the robotic arm 140 and coupled with the power line 436 to power cutting devices 462 of the cutting end effector 160C. The cutting end effector 160C can be controlled by the automated drywalling system 100 to cut drywall or perform other cutting operations. In some examples, the cutting end effector 160C can comprise a cutting vacuum that is coupled to vacuum source 422 via the vacuum line 424 to ingest debris generated by cutting done by the cutting end effector 160C.

The hanging end effector 160H can alternatively be coupled at the distal end 144 of the robotic arm 140 and coupled with the power line 436 to power hanging devices 464 of the hanging end effector 160H. The hanging end effector 160H can be controlled by the automated drywalling system 100 to hang drywall, assist with drywall hanging, or the like.

The mudding end effector 160M can alternatively be coupled at the distal end 144 of the robotic arm 140 and coupled with the power line 436 to power mudding devices 466 and/or mudding applicators 468 of the mudding end effector 160M. The mudding end effector 160M can be controlled by the automated drywalling system 100 to perform "mudding" or "mud work" associated with drywalling, including application of joint compound (also known as "mud") to joints between pieces of hung drywall, and the like. Joint compound as discussed herein can encompass pre-mixed, topping, taping, multi-use, all-purpose, and setting type compounds. Additionally, the mudding end effector can also be configured to apply joint tape, or the like. Additionally, the mudding end effector 160M can comprise a mudding vacuum 469 that is coupled to vacuum source 422 via the vacuum line 424 to ingest excess joint compound or mud generated by the mudding end effector 160M.

The sanding end effector 160S can alternatively be coupled at the distal end 144 of the robotic arm 140 and coupled with the power line 436 to power sanding devices 464 of the sanding end effector 160S. The sanding end effector 160S can be controlled by the automated drywalling system 100 to sand mudded drywall, and the like. Additionally, the sanding end effector 160S can comprise a sanding vacuum 472 that is coupled to vacuum source 422 via the vacuum line 424 to ingest debris generated by sanding done by the sanding end effector 160S.

The painting end effector 160P can alternatively be coupled at the distal end 144 of the robotic arm 140 and coupled with the power line 436 to power a paint sprayer 474 and/or painting devices 476 of the painting end effector 160P. The painting end effector 160P can be controlled by the automated drywalling system 100 to paint drywall or other surfaces. Additionally, the painting end effector 160P can comprise a painting vacuum 472 that is coupled to vacuum source 422 via the vacuum line 424 to ingest excess paint spray generated by painting done by the painting end effector 160P.

Although the example automated drywalling system 100 of FIG. 4 is illustrated having five modular end effectors 160, other embodiments can include any suitable plurality of modular end effectors 160, with such end effectors 160 having any suitable configuration, and being for any suitable task or purpose. In further examples, the automated drywalling system 100 can comprise a single end effector 160, which can be permanently or removably coupled to the robotic arm 140. Additionally, in some examples a given end effector 160 can be configured to perform a plurality of tasks. For example, in one embodiment, an end effector 160 can be configured for mud work, sanding and painting. Accordingly, the example of FIG. 4 should not be construed to be limiting on the wide variety of other embodiments that are within the scope and spirit of the present disclosure.

Figure 5:
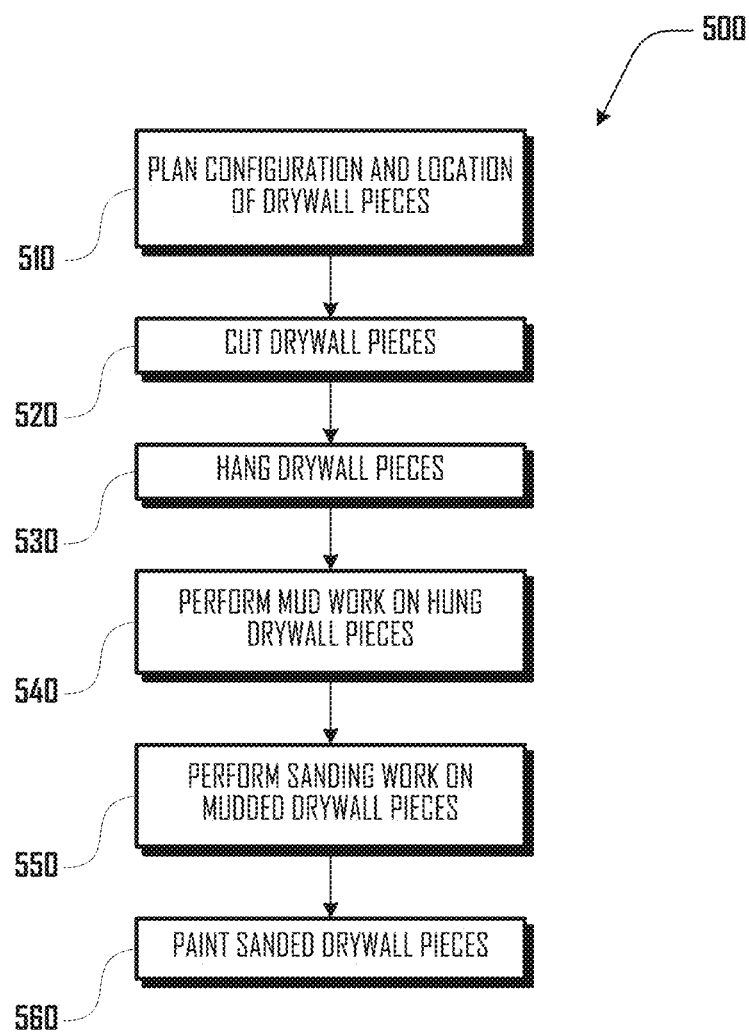
FIG. 5 illustrates a block diagram of method of installing drywall in accordance with one embodiment.

Turning to FIG. 5, a method 500 of drywalling is illustrated, which can be performed in whole or in part by an automated drywalling system 100 as discussed herein. The example method 500 or portions thereof can be performed automatically by the automated drywalling system 100 with or without user interaction.

The method 500 begins at 510, where a configuration and location of drywall pieces is planned. For example, in some embodiments, the automated drywalling system 100 can be configured for automated scanning and mapping of a worksite (e.g., framing elements of a house or building) and automated planning of the shapes and sizes of drywall to be disposed at the worksite to generate walls, ceilings, and the like. Such scanning and mapping can include use of vision systems 324, 364 (FIG. 3) and the like. Planning of shapes and sizes of drywall can be based at least in part on the scanning and mapping and can be performed by a computing device 100 of the automated drywalling system 100 or other suitable device, which can be proximate or remote from the automated drywalling system 100. In some embodiments, such planning can be based at least in part on building plans or maps that were not generated by the automated drywalling system 100.

The method 500 continues to 520, where drywall pieces are cut. Such cutting can be based at least in part on the scanning, mapping and planning discussed above. Additionally, such cutting can be performed by the automated drywalling system 100 at a worksite (e.g., via a cutting end effector 160C) or can be performed by a system remote from the worksite and generated drywall pieces can be delivered to the worksite.

At 530, generated pieces of drywall can be hung at the worksite, including hanging on studs, beams, posts, wall plates, lintels, joists, and the like, to define walls, ceilings and the like. Screws, nails or other suitable fasteners can be used to hang the drywall pieces. In some embodiments, the automated drywalling system 100 can be configured to hang drywall pieces including positioning the drywall pieces and coupling the drywall pieces in a desired location. In some examples, the automated drywall system 100 can be configured to assist a user in hanging drywall, including holding the drywall and/or tools in place while the user fixes the drywall pieces in place. In various examples a hanging end effector 160H can be used for such drywall hanging.

At 540, mud work can be performed on the pieces of hung drywall. For example, joint compound (known also as "mud") can be applied to seams or joints between adjacent pieces of drywall, over surfaces of the drywall, and/or can be applied over fasteners such as drywall screws or the like. In various examples, a mudding end effector 160M can be used to perform such mud work.

At 550, sanding can be performed on the mudded pieces of drywall. For example, where wet joint compound is applied to hung drywall pieces, the joint compound can be allowed to dry and can then be sanded by a sanding end effector 160S of an automated drywall system 100. In various examples, sanding can be performed to smooth out joint compound to generate a planar or otherwise consistent profile on the pieces of drywall in preparation for painting. At 560, the sanded drywall pieces can be painted. For example, in various examples, a painting end effector 160P of an automated drywalling system 100 can be used to paint the drywall pieces.

Although the method 500 of FIG. 5 relates to hanging and finishing drywall, it should be clear that other hanging and finishing methods can similarly be employed by the automated drywalling system 100, including methods related to hanging particle board, plywood, sheet rock, laminate, tile, wall boards, metal sheeting, lath and the like. Similarly the methods can be used with different coatings including plaster, polymer coatings, cement, stucco, organic coatings, and the like. Accordingly, the method 500 of FIG. 5 should not be construed to be limiting.

During mud work, automated drywalling system 100 can apply a layer or profile of compound that is greater than a thickness that can conventionally be manually applied by human workers to allow for a sanding system (e.g., a sanding end effector 160S) to sand down the compound to a desired plane. For example, in some examples, manual joint compound application mud can be profiled to taper from high points. The automated drywalling system 100 can apply a thicker layer than normal enabling a sanding system to sand down high points to be level to the adjacent surfaces.

For example, FIGS. 6a, 6b, 6c, 6d and 6e illustrate one example of a mud application profile for a pair of drywall pieces 610A, 610B that form a seam 620, where joint compound 630 is applied over consecutive layers, which can include joint tape 640, to taper out the high points of joint compound 630 over a wider area. Sanding can then be used to smooth out the final profile. The high points of joint compound 630 can be caused by various features, including the seam 620, feature, raised stud, defect, or any combination of these. In some embodiments, such a mud application can be undesirable for automated application; however, in further embodiments, such a mud application profile can be employed by an automated system such as the automated drywalling system 100.

FIGS. 7a and 7b illustrate an example joint compound application process where the joint compound 630 is applied in a thick layer using a sprayer that generates a mud spray 700. Such an application process can be performed by the automated drywalling system 100 in various embodiments. The thickness of the joint compound 630 being applied to the pieces of drywall 610A, 610B defining the seam 620 can allow for a sanding system to be used to sand back high points of joint compound 630 to a level surface. The high points of joint compound 630 can be caused by the seam 620, feature, raised stud, defect, or any combination of these.

Figure 8A:
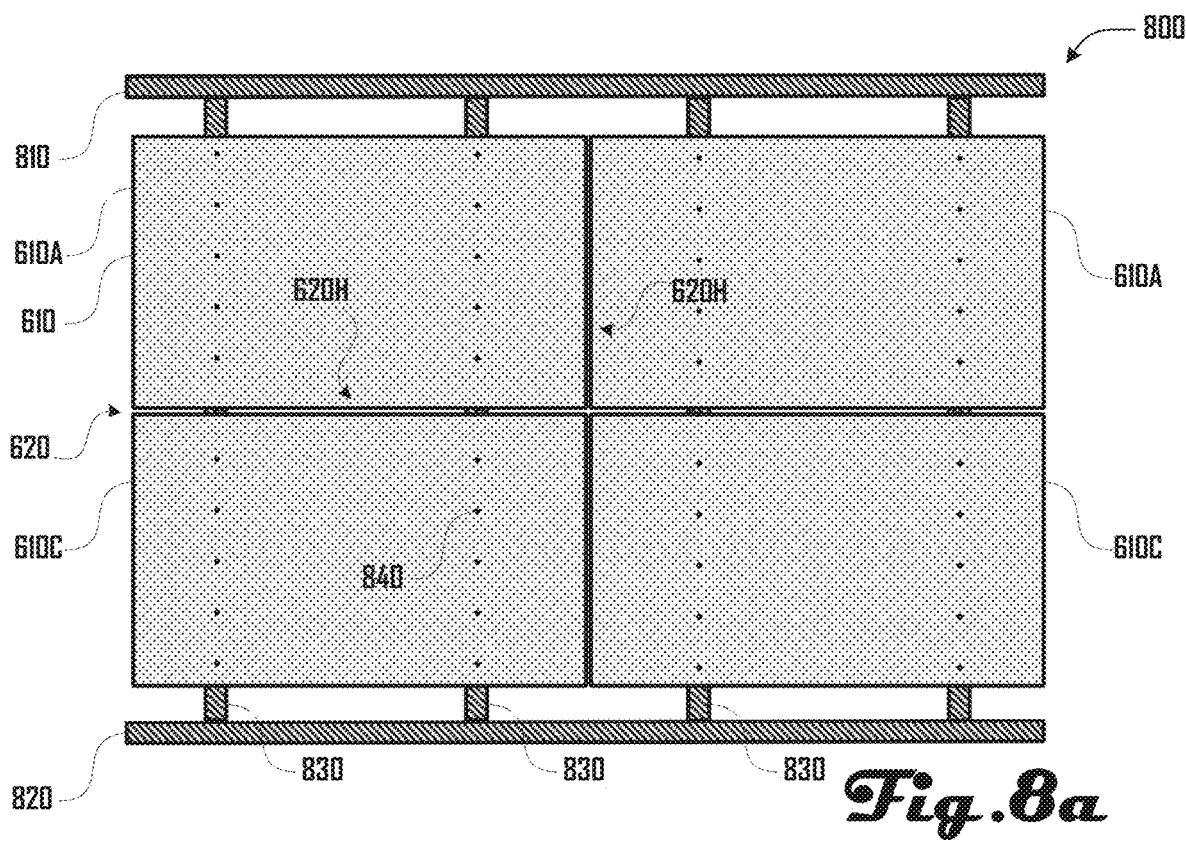
FIGS. 8a, 8b, 9a, 9b illustrate a series of steps in an example method of installing drywall to generate a wall assembly.
Figure 8B:
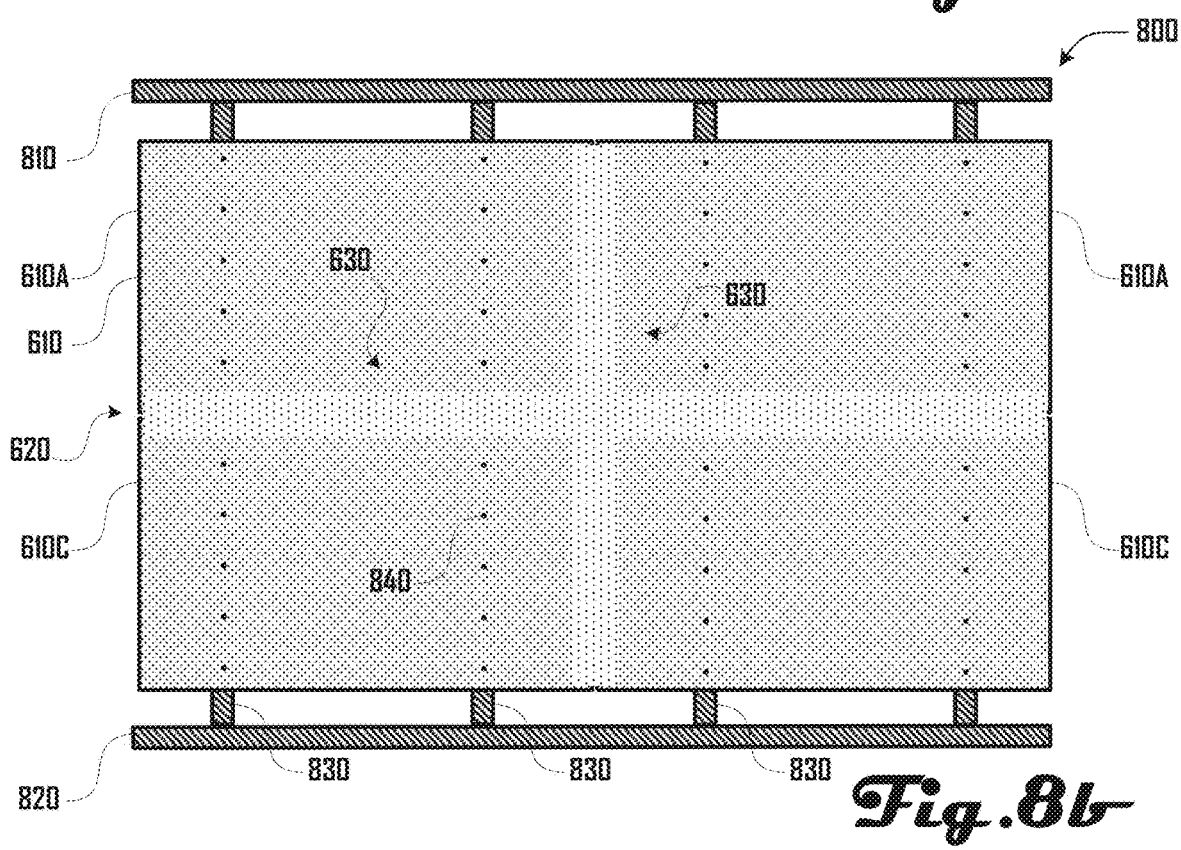
Figure 9A:
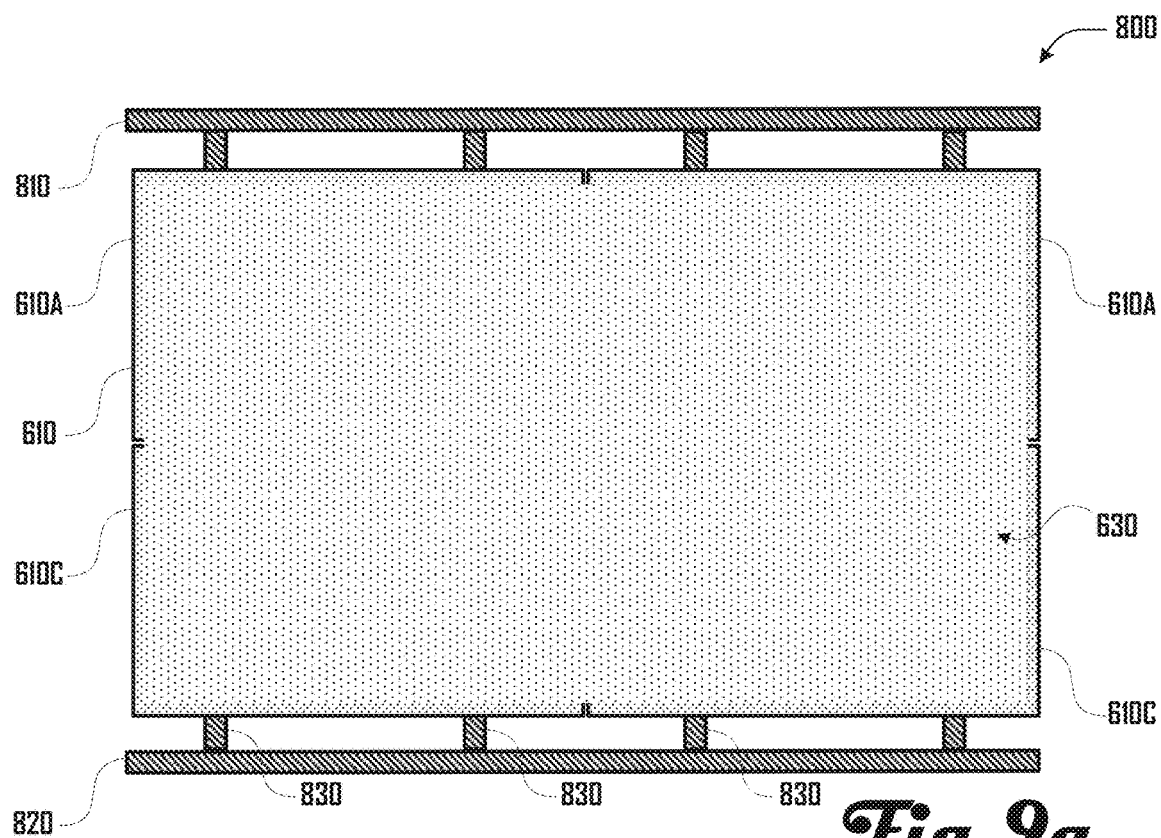
Figure 9B:
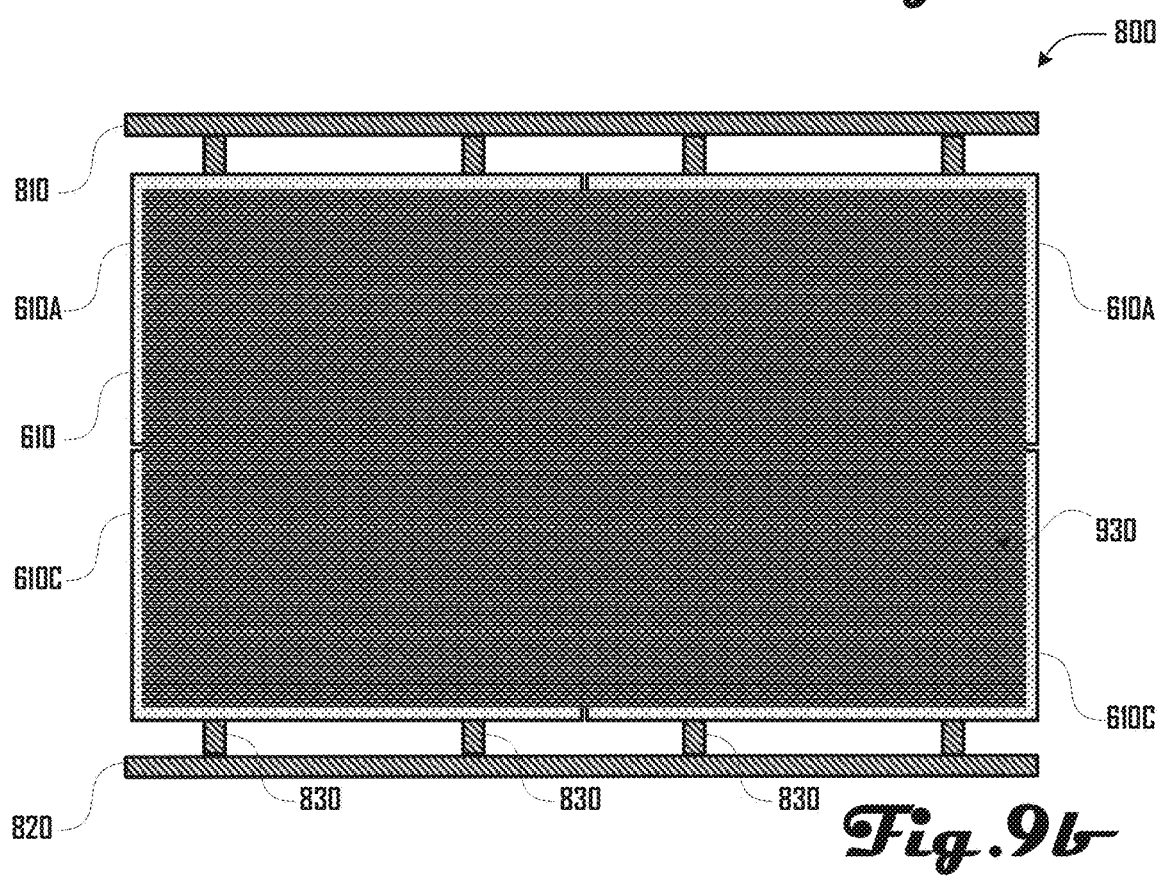

Turning to FIGS. 8a, 8b, 9a and 9b, examples of a wall assembly 800 including a plurality of drywall pieces 610A, 610B, 610C, 610D is illustrated. The wall assembly 800 can comprise a header 810 and footer 820, with a plurality of studs 830 extending therebetween. As shown in FIG. 8a, the drywall pieces 610 can be coupled to the studs 830 via a plurality of fasteners (e.g., drywall screws) that extend though the drywall pieces 610 and into the studs 830. The drywall pieces 610 can define one or more seams 620, including in the example of FIG. 8a a vertical seam 620V and a horizontal seam 630H. In some embodiments, mud work can be performed on the seams 620 as shown in FIG. 8b and leaving portions of the drywall pieces 610 without joint compound 630. Additionally or alternatively, joint compound can be applied to portions of the drywall pieces 610 in addition to about the seams 620 as shown in FIG. 9. The wall assembly 800 of FIG. 8b or 9a can then be sanded to generate a smooth profile or other profile as desired and the sanded wall assembly can be coated with paint 930 as shown in FIG. 9b.

One aspect pertains to a computational planner that can be used to optimize an automated process for installing and finishing drywall. In various embodiments, such a computational planner can include non-transitory computer readable instructions that when executed by a processor of the system 100 can cause the system to perform the methods or any suitable portions of the methods described herein. For example, the computational planner can comprise a program executed by the control system 322 or other suitable device.

The computational planner can be used to control and create plans for the automated drywalling system 100 that as described herein can include base unit 120, robotic arm 140, and/or end effector 160. The process of installing and finishing drywall can include, but is not limited to, optimizing the layout of drywall 610 to cover a wall assembly 800, surface, ceiling, or the like. The process of installing and finishing drywall can also include planning toolpaths for cutting drywall 610 or marking drywall 610 for cutting to fit the prescribed layout; creating a plan to work alongside or assist an operator with base unit 120, robotic arm 140, and/or end effector 160 in the hanging of drywall 610.

A planner can also be used to create toolpaths, tool parameters and/or machine paths for applying joint compound 630 onto drywall 610 for finishing. The planner can optimize the application of joint compound 630 to address board joints 620, low or high spots, screws, anchors or any other defects in order to achieve a desired visually flat surface. The computational planner can also plan toolpaths and set tool parameters to sand applied joint compound 630 and/or for applying paint 930 or other suitable coating to mudded and sanded drywall 610. The planner can use information and maps from any of the previous and subsequent steps to determine the optimal process specifications for any given step.

The computational planner can be driven by a variety of inputs that enable the planner to determine tool paths and/or tool parameters for base unit 120, robotic arm 140, and/or end effector 160 to execute one or more drywalling task given defined finish requirements and/or system constraints. In various embodiments a step in a method for drywalling can include creating a map of target surfaces, wall assemblies or the like. In some examples, this map or model can be created by importing building information modeling (BIM) and/or 2D, 3D plans into the planner system. In further examples, such a map can be created directly by the system 100 by utilizing vision systems 324, 364 and/or sensors 326, 346, 366 scan a room or worksite. The example vision systems 324, 364 or scanning technologies can include stereo cameras, structured light, cameras, LIDAR, radar, sonar, laser scanners, thermal imaging or the like. Uploaded 3D or 2D plans can be combined with field data to create a more accurate map of the environment. The data from different sources (e.g., from plans and scanning a room) can be combined using key features and user input. The map can include the location of elements of a wall assembly including a header 810, footer 820, framing studs 830, drywall joints, openings, protrusions, as well as pipes, electrical conduit, ventilation ducts, and any other components installed on the walls or ceilings. These locations can be derived from uploaded plans, room scan user inputs, and the like. To facilitate the creation of a map, a user can help identify features through analysis of images, tagging of the features physically or digitally, and the like. The user can physically tag components of a wall assembly using a laser, tags, markers or the like. One or more of the vision systems 324, 364 and/or sensors 326, 346, 366 can pick up these tags or track the tags as a user moves around the room and locates the features.

The computational planner system can use one or more vision systems 324, 364 to identify surfaces, seams, fasteners, cutouts, obstacles, workers, edges, and any other feature or component in a build site. In some examples, one or more vision systems 324, 364 can include cameras, time of flight sensors (laser range finders, 3D laser scanners, ultrasonic), triangulation systems, structured light scanners, modulated light scanners, stereoscopic systems, photometric silhouette systems, and the like. The one or more vision systems 324, 364 can identify and/or track features of the base unit 120, robotic arm 140, and/or end effector 160 to estimate a robot state. The system 100 can utilize several estimates of the robot state such as a kinematic model and odometry, joint level sensing, and/or a vision estimate to create a more accurate representation of the robot state. The identification of features can be simplified by placing unique tags on various portions of the base unit 120, robotic arm 140, end effector 160, workspace, objects, and the like. The one or more vision systems 324, 364 can utilize information about tags to search and ID the tags. The system 100 can have a file of information corresponding to various tags or features. The file can include information such as a full 3D model, size, weight, use of the marked object, and the like.

The one or more vision systems 324, 364 can be used to create a full or partial model of a room, work surface or construction site. The system 100 can utilize a previously generated 3D model of such a space to enhance the model created by one or more vision systems 324, 364, or to fit the data from the one or more vision systems 324, 364. Features that the one or more vision systems 324, 364 can look for include corners, edges between adjacent walls, ceiling, floor, windows, doors, outlets, seams, fasteners, openings, and the like. The system 100 can utilize one or more vision systems 324, 364 and/or sensors 326, 346, 366 to achieve full workspace coverage and to help ensure features are not occluded by the robot or other components. The vision systems 324, 364 and/or sensors 326, 346, 366 can be mounted on the base unit 120, robotic arm 140, and/or end effector 160 as discussed herein, and/or can comprise standalone units that can be disposed in the work area. During a given drywalling task, the vision systems 324, 364 and/or sensors 326, 346, 366 can be used to identify and establish a plane of a target surface. The system 100 can use the surface to guide the motion of the base unit 120 along the wall controlling the distance between the robot base 120, wall and/or ceiling. One or more of the vision systems 324, 364 and/or sensors 326, 346, 366 can be used to identify seams 620 fasteners 640, and the like before taping, after taping and/or after being covered with joint compound 630. The location of such elements can allow the planner to establish how the surface should be finished and track to the location of the base unit 120, robotic arm 140, and/or end effector 160.

The computational planner can utilize one or more vision systems 324, 364 and/or sensors 326, 346, 366 to achieve a desired workspace coverage and to help ensure features are not occluded by the base unit 120, robotic arm 140, end effector 160, obstacles, workers, or the like. The one or more vision systems 324, 364 can comprise multiple full or partial combination of multiple cameras, ranging systems, and the like whose outputs can be stitched together to create a composite point cloud, image, model of a workspace, or the like. In some examples, the system 100 can use multiple RGB cameras with depth sensors (RGBD) and/or LIDAR sensors. The system 100 can operate in an iterative manner where the planner adjusts the viewpoint of the one or more vision systems 324, 364 to "get a closer look" at features or cutouts, to look behind an obstacle, and the like. The planner can utilize simultaneous localization and mapping (SLAM) to construct and update a map of the environment while simultaneously keeping track of the location of the base unit 120, robotic arm 140, and/or end effector 160. In some examples, the autonomous mobile base 120 can be driven by outputs of a SLAM algorithms, odometry, safety sensors, and the like. SLAM algorithms can use BIM, maps, models, or the like, of the site as a starting point for mapping. The planner can use SLAM to patch or update existing maps. The mobile base 120 can be used to move the vision systems 324, 364 and/or sensors 326, 346, 366 around a workspace to collect a map of a workspace.

The planner can use confidence levels in the measurements and maps that the planner has created to determine a need to revisit an area of the workspace by getting a closer view, a new view, or a different viewpoint of the low confidence areas. Confidence thresholds can be adjusted in various suitable ways, including by a machine learning algorithm or by the user directly if a workspace has a lot of complex features or occluded areas. In various examples, the one or more vision systems 324, 364 can use a coarse first scan to get a quick general layout of the workspace and then trigger a fine sampling of one or more specific areas that are determined to contain features or details. Fine sampling can also be triggered by low confidence measurements, by the user, and/or fine sampling can be continuously done as the system 100 traverses a workspace completing a task allowing the one or more vision systems 324, 364 a closer view of each selected area.

In some embodiments, the one or more vision systems 324, 364 can be driven by the features identified in uploaded maps or models. For example, by comparing a system generated scan of a room to uploaded models the system 100 can check the scan for the identified features. In various examples, if the scan generated by the system 100 does not have good data or is missing one or more features identified by an uploaded model or map, the planner resource of the system 100 can direct the system 100 to re-scan or get a different view of the target area. In some embodiments, a user can be prompted to provide input if the system 100 cannot locate one or more feature indicated by an uploaded model or map.

In some embodiments a system planner can operate under a continuous planning mode where the system 100 does not attempt to map the work area completely but instead maps out parts at a time and treats those work areas. This partial mapping can be done at a room level, surface level (e.g., a wall, ceiling), or on a portion of the surface. As the system 100 moves to execute a task, a map of the worksite can be updated and new sections of work can be planned by the system planner. In some examples, the system planner can utilize the base unit 120, robotic arm 140, and/or end effector 160 to create a map of a room before creating a plan for executing one or more task in the room. In some examples, regardless of the planning strategy, (e.g., local vs global) the tool paths and/or tool parameters can be updated based on new scans of the area and/or based on feedback from the base unit 120, robotic arm 140, and/or end effector 160.

2D or 3D Maps created by the system 100 (e.g., 2D or 3D) can be registered to the physical environment utilizing recognizable features such as doors, windows, outlets, corners, or the like. Such registration can also be done using markers, tags, laser outlines or the like that are placed in the room. A projection or visualization system can find the features or markers and can locate a map created using such features. The system 100 can utilize a user interface to enable a user to help locate a map or projection relative to the environment and resolve any issues or discrepancies. The user can utilize a physical marker to signify key features for the system 100, allowing the system 100 to locate a map relative to the environment. The system 100 can also use the robotic arm 140, and/or end effector 160 to find target features, markers or surfaces and locate them relative to the base unit 120 which can be located using vision systems 324, 364 and/or sensors 326, 346, 366 including a localization system that can comprise laser range finders, computer vision, LIDAR, radar, sonar, stereo vision, odometry, IMUs, or the like.

In some embodiments, a computational planner of the system 100 can use a multi-modal approach to augment the vision systems 324, 364. For example, the system planner can utilize contact measurements to refine the vision estimate generated by one or more of the vision systems 324, 364. The one or more of the vision systems 324, 364 can serve as a starting point with other modalities being used to reduce noise, uncertainty and the like, to give a more accurate model. The one or more of the vision systems 324, 364 can provide an estimate with an error band and the contact measurements can be used to reduce that error band by providing another estimate using the contact point and the system 100 state to give a measurement of the location of the contact point relative to the mobile base 120.

The robotic arm 140 can utilize a compliant end effector 160 to enable safe contact with the environment, which can allow the system 100 to accurately locate target surfaces, features, components, or the like, and accommodate errors in positioning without damaging the substrate or the robotic arm 140. In various embodiments, by utilizing the robotic arm 140 and compliant end effector 160 to locate a physical component, the system 100 can establish a point, line, or plane and therefore locate a virtual plan on the physical environment. Toolpaths and/or tool parameters can then be updated from the virtual plane to the physical plane. Refitting of the tool paths onto the contacted surfaces can enable the system 100 to deal with errors and discrepancies between the modeled environment and physical environment. In various embodiments, such methods can enable quick on-site calibration using global room-wide maps and local measurements. Refitting toolpaths can allow for correcting errors in positioning of the base unit 120, robotic arm 140, and/or end effector 160. In various embodiments, the system 100 can utilize vision systems 324, 364 and/or sensors 326, 346, 366 (e.g., radar, sonar, thermal imaging, or the like) to establish what is behind drywall 610 that is coupled to a wall assembly 800, and this information can be used to update a virtual map of the wall assembly 800 to help ensure that no damage is done to any electrical, plumbing, ventilation, or the like that is present behind the drywall 610 that is coupled to a wall assembly 800.

In some examples, the computational planner of the system 100 can utilize point clouds and/or images collected by one or more of the vision systems 324, 364 and segment such point clouds and/or images into a geometric map of the space. This process can involve filtering out noise, averaging sensor readings, and excluding data points that are outside a set range or confidence level. The system 100 can fit models to surfaces, features, extremities, intersection of surfaces, and the like. The planner can utilize clustering, filtering, and feature extraction algorithms, or the like, to process data and extract a geometric map and/or determine one or more surfaces that need to be treated.

The planner can use one or more vision systems 324, 364 and/or sensors 326, 346, 366 to identify no-go zones, which are zones that should not be treated. For example, such no-go zones can comprise 2D areas on a surface such as windows, outlets, or other openings that should not be treated; therefore, the end effector 160 should not be driven to enter these areas. No-go zones can also be 3D volumes that the base unit 120, robotic arm 140, and/or end effector 160 should not be driven to enter. In various examples, such no-go zones can comprise sensitive spaces, or volumes that are filled by obstacles, equipment, people, and protrusions from a target surface. The vision systems 324, 364 and/or sensors 326, 346, 366 can identify an obstacle, object, person, or the like and create a 3D volume no-go zone around such an identified obstacle, object, person, or the like, to identify locations that the computational planner should not drive the vision systems 324, 364 and/or sensors 326, 346, 366 to enter. Once such an obstacle, object, person, or the like, is identified it can be tracked and the no-go volume or plane can be updated.

In other words, two or three dimensional no-go zones can be identified by the system 100 and/or by a user and these no-go zones can be updated based on movement of objects (e.g., workers, robots, construction materials, or the like) or can be updated based on changes in conditions within go zones and/or no-go zones (e.g., addition of drywall, mudding, sanding, painting). In various embodiments, establishing and/or updating such go and no-go zones can be important for workers and other people who will be moving around the system 100.

The planner can output tool poses, tool paths, and/or tool parameters for the base unit 120, robotic arm 140, and/or end effector 160 including joint commands, target poses, end effector positions, and the like. The system 100 can also output paths for a gantry system or positioning stage which can be used in conjunction with the base unit 120, robotic arm 140, and/or end effector 160 or without a robot to move and position tools associated with an end effector 160. The planner can also output paths for the mobile base unit 120, which can be autonomous in various examples, to position a gantry, positioning stage, robotic arm 140, and/or end effector 160 to move a tool to assist a user in the hanging, cutting and finishing process, or to position visualization equipment, lighting equipment, and the like. The mobile base unit 120 and vertical lift 126 of the base unit 120 can work in coordination with a user, robotic arm 140, and/or end effector 160 to execute various drywalling tasks. The planner system can control the different components of the system 100, which can allow for coordinated movements and forces with the target goal of moving a tool of an end effector 160 to a desired position under the desired forces and/or moments. The position of the mobile base 120 can be used as a rough positioning stage in some examples, with the vertical lift 126 setting the height of the robotic arm 140, and/or end effector 160 which can act as a fine positioning stage.

The computation planner of the system 100 can coordinate motions of components of the system 100 to facilitate movement around obstacles, through tight spaces or doorways, under low ceilings, to access hard to reach areas, and the like. In some embodiments, planner can move the system 100 to clear the view of one or more of the vision systems 324, 364 and/or sensors 326, 346, 366. In further embodiments, the planner can move or stow the system 100 to facilitate navigation.

In some examples, the planner can have full knowledge of the robot workspace and kinematics of the base unit 120, robotic arm 140, and/or end effector 160. In various embodiments this can enable the computational planner to plan tasks, tool parameters and toolpaths were motion of the base unit 120 can be coordinated with motions of the robotic arm 140, and/or end effector 160 to access hard to reach spaces (e.g., by raising or lowering the lift 126). Similarly, the computational planning system can coordinate the motion the different components (e.g., base unit 120, robotic arm 140, and/or end effector 160) to address various drywalling tasks (e.g., hanging, mudding, sanding, painting, and the like) in a most optimal manner. Such optimization can be driven by various factors, including time, material usage, safety, energy, reducing amount of manual work, and the like.

An example of such coordination between the base unit 120, robotic arm 140, and/or end effector 160 can include using the mobile base 120 as a rough positioning stage and utilizing the robotic arm 140, and/or end effector 160 as a fine positioning stage. In various embodiments, this approach can remove high positional accuracy requirements from the base unit 120, which can allow the robotic arm 140 and/or end effector 160 to correct for small errors in the position of the base unit 120. The planner can also utilize the base unit 120, robotic arm 140, and/or end effector 160 to move obstacles out of the way of the mobile base 120 or to position one or more of the vision systems 324, 364 and/or sensors 326, 346, 366.

In various embodiments, the planner can continuously monitor input received from one or more of the vision systems 324, 364 and/or sensors 326, 346, 366 (e.g., images of robot positions and data regarding robot kinematics) to determine if a path of the base unit 120, robotic arm 140, and/or end effector 160 can lead to any collisions in the static or changing environment. For example, the planner can run an optimization on the different poses that the system 100 can use to reach a target end effector position and select a sequence of poses that avoids joint limits, collisions, areas where the mobile base cannot reach, and the like. Similarly, the planner can run an optimization on possible paths that mobile base 120 can take to reach a desired position within the room and select one or more path that avoids various elements, including collisions, interferences with the operator, other systems, and the like. Paths can also be selected based on a path that provides the best viewpoint of the workspace, or a path that is most time, distance, energy efficient, and the like.

In various embodiments, the computational planner can address a workspace by dividing the workspace up into segments that can be processed by a stationary base unit 120, robotic arm 140, and/or end effector 160 based on robot kinematics, tool parameters and the like. The system 100 can optimize how a workspace is split up into pieces to minimize movements of the base unit 120, robotic arm 140, and/or end effector 160 or to facilitate concurrent manual work. The system 100 can also complete various drywalling tasks by creating a plan where the mobile base 120 is stationary or in motion while a given task is being executed. The plan can call for continuous navigation where the system 100 is no longer stationary while executing tool paths of the base unit 120, robotic arm 140, and/or end effector 160. The motion of the base unit 120, robotic arm 140, and/or end effector 160 can be coordinated to enable a larger workspace.

The planning system can utilize mobile base accessibility constraints, robot manipulator kinematics, tool dimensions and constraints in conjunction with a map or model of a workspace to determine whether the drywalling system 100 is capable of executing a prescribed task. The planner can give a user information on the limiting constraints as well as parameters that can be changed to allow the system 100 to complete one or more task (e.g., via a user interface or display). The planner can use a workspace model and constraints of the system 100 to estimate how long it may take to complete one or more task, including but not limited to, a navigation time, processing time(s) for the workspace and separate sections, total task time, and the like. The planner can also compute material and/or tool requirements for a workspace in various embodiments.

The computational planner can operate on-line or in real-time, making adjustments to the maps, toolpaths, and/or tool parameters given changing conditions. In various embodiments, the planner can create a global plan that extends beyond a single workspace. For example, such a global plan can involve planning how to treat a full surface, multiple surfaces, full rooms or multiple rooms given maps uploaded to and/or created by the system 100. The planner can do dynamic re-planning if a user sub-selects passes in the process path, which can result in the recalculation of the paths and behaviors to incorporate the user inputs.

In various embodiments, the planner can monitor tool or robot conditions such as hose or cable windup, joint limits, and the like, and can insert on-the-fly behaviors or additional moves to home the system 100 and avoid various limits. The planner can also deal with interruptions or interventions where a plan is suspended or aborted during the process. The planner can re-plan with an intervention allowing the user or system 100 to execute a task such as clearing a clog, replacing a worn component, checking the quality or progress, cleaning, clearing an obstacle, or the like.

The planner can update the toolpaths, tool parameters, and the like, to resume the task as required. This updated plan can include backtracking to ensure correct overlaps, adding way points to deal with tool on-off times, and the like. In various embodiments, the computational planner can automatically initiate interruptions or interventions without any user input by monitoring task conditions, task progress, environmental conditions, robot and mobile base states, obstacles, user location, and the like.

The computational planner can utilize one or more of the vision systems 324, 364 and/or sensors 326, 346, 366, including environmental sensors such as humidity, temperature, air flow sensors, and the like, to establish environmental conditions of a workspace and adjust task parameters accordingly. For example, the planner can utilize environmental sensors to determine optimal joint compound mixture ratios, set path parameters such as feed speed, thickness of mud applied, blade profiles and pressures, sprayer settings, or the like. Environmental information in conjunction with the joint compound parameters can be used to determine or estimate drying and setting times for the mud, which can allow the system 100 to plan when a next step should begin. The system 100 can also determine when joint compound 630 has set and dried by measuring the moisture content, thermal conductivity, or the like, of the covered seam, using vision systems 324, 364 and/or sensors 326, 346, 366 (e.g., a thermal imaging camera, contact or non-contact thermometer, or the like), to detect differences in colors using one or more vision systems 324, 364, or the like. In various examples, thermal measurements can be used to infer moisture content by comparing the temperature of the joint compound 630 to the surrounding materials. For example, as water or other solvent evaporates from the mixture, the temperature of the joint compound 630 can be lower than that of the surrounding materials.

Models of a joint compound drying process can also be used to estimate the time to dry or cure joint compound 610 being used given a set of starting conditions and information about the environment, which may be obtained by the system 100 as discussed above. Similarly models of the joint compound 630 in combination with environmental and/or drywall information can be used to estimate drying shrinkage of the drywall 610. The vision systems 324, 364 and/or sensors 326, 346, 366 can be used in conjunction with environmental control systems such as an HVAC system or heater, air conditioner, fans, or the like, to control conditions of a workspace or room in which the system 100 is performing drywalling tasks. Data from one or more of the vision systems 324, 364 and/or sensors 326, 346, 366 can trigger various environmental control systems maintain the room at desired conditions or change the room to desired conditions for quality, reduced drying time, comfort of the operator, and the like. The environmental conditions captured by one or more of the vision systems 324, 364 and/or sensors 326, 346, 366 can be used to determine optimal paint parameters including but not limited to a desired applied thickness, viscosity, mixture composition, number of coats, drying time, and the like.

Figure 10:
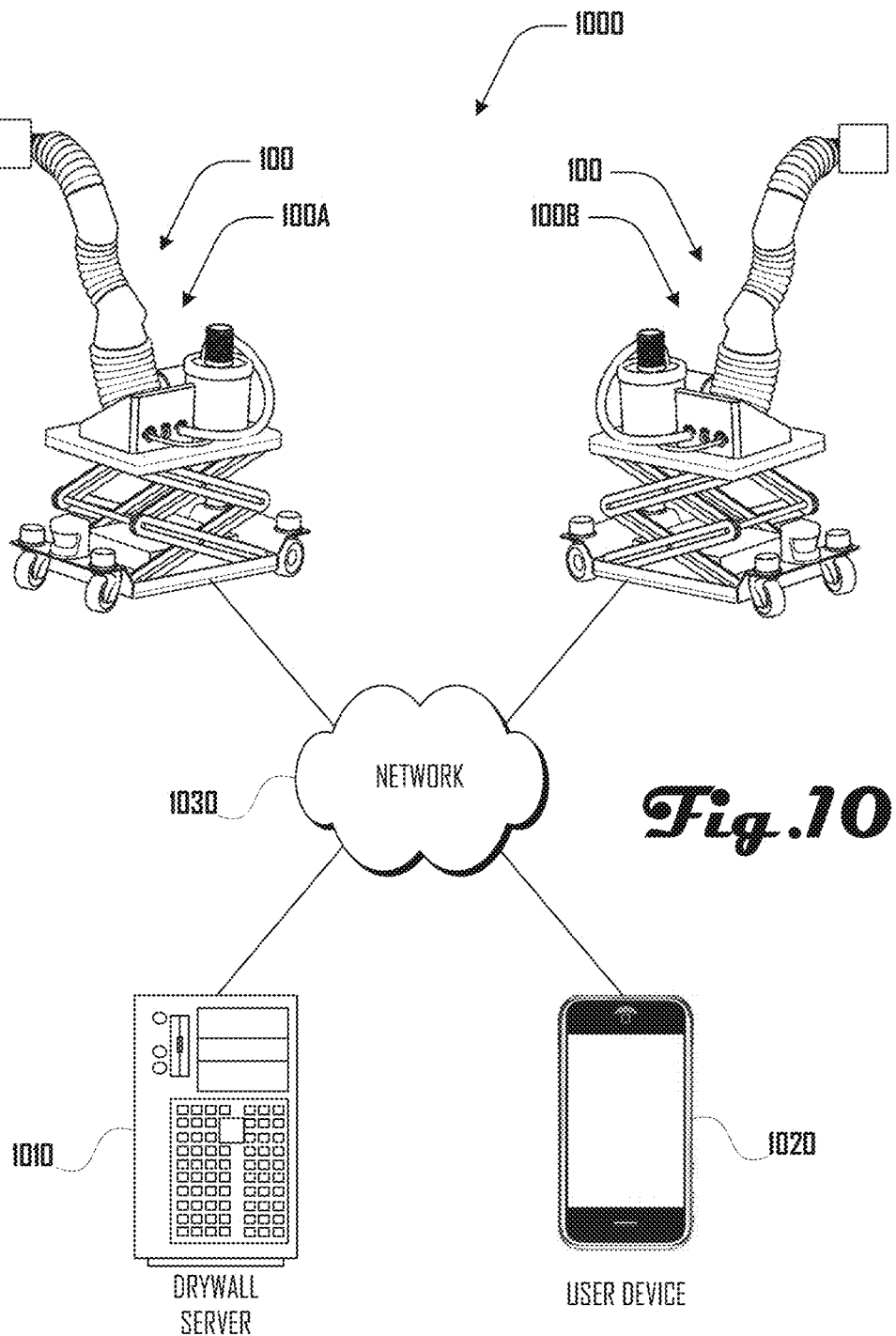
FIG. 10 illustrates an embodiment of an automated drywalling system network comprising a plurality of automated drywalling systems in accordance with one embodiment.

Turning to FIG. 10, an example of an automated drywalling system network 1000 that comprises a plurality of automated drywalling systems 100 is shown, which includes a first and second drywalling system 100A, 100B that are operably connected to a drywall server 1010 and a user device 1020 via a network 1030.

In various embodiments, the first and second drywalling systems 100A, 100B can be the same system 100 or can be different systems 100. For example, the first and second drywalling systems 100A, 100B can have the same or different end effectors 160, the same or different computing capabilities, or the like. In some embodiments, the systems 100 can be configured for performing different drywalling tasks at the same time or can be configured for performing the same drywalling task at the same time (e.g., hanging, mudding, sanding, painting, or the like). For example, FIG. 11 illustrates an example of a drywalling system comprising a first automated drywalling system 100A painting and a second automated drywalling system 100B performing sanding.

In some examples, the user device 1020 can be used to control one or more of the systems 100 and/or receive data from the systems 100 related to drywalling tasks, system status, system setup, and the like. The user device 1020 can be present locally with the systems 100 and/or can be remote from the systems 100. For example, a user can initiate one or more drywalling task to be performed by one or more of the systems 100 while the user and user device 1020 are present at a worksite with the systems 100 and can monitor progress of the systems 100 and the one or more tasks remotely via the user device 1020. Although a single user device 1020 is illustrated in FIG. 10, in further examples, an automated drywalling system network 1000 can comprise any suitable plurality of user devices 1020 or a user device can be absent. Additionally, while the user device 1020 is shown as being a smartphone in the example of FIG. 10, in various embodiments the user device 1020 can comprise any suitable device including a laptop computer, tablet computer, wearable computer, gaming device, home automation system, augmented or virtual reality system or the like.

In various embodiments, the drywall server 1010 can be used to control the automated drywalling systems 100, store data related to the automated drywalling systems 100 and the like. For example, as discussed in more detail herein one or more maps or models of one or more worksites or portions of one or more worksites can be stored at the drywall server 1010. In various examples, a user device 1020 can communicate with the drywall server 1010 to configure, program, or otherwise control the systems 100. In some embodiments, the drywall server can comprise one or more physical or cloud-based server and in some embodiments the drywall server 1010 can be absent. The network

1030 can comprise any suitable wired or wireless network including the Internet, a Wi-Fi network, a Bluetooth network, a cellular network, a local area network (LAN), or the like.

As discussed herein, in some examples, the automated drywall systems 100 can comprise a computational planner (e.g., executed by a control system 322 of a respective system 100). In some embodiments, one or both of the drywall server 1010 or user device 1020 can execute a computational planner and one or more of the automated drywall systems 100 may or may not execute a computational planner. In further embodiments, one or both of the drywall server 1010 or user device 1020 can execute a master computational planner with the systems 100 executing a sub-planner. In some embodiments, a plurality of systems 100 can be controlled by a computational planner being executed on one of the plurality of systems 100.

A planner can be used to plan tasks for one or more drywalling system 100. For example, the planner can be extended beyond a single system 100 to coordinate the paths and tasks for multiple drywall automation systems 100, which may or may not include a planning system. Such fleet coordination of a plurality of automated drywalling systems 100 can involve uploading maps, models, or the like created by one system 100 to a local or remote database, which can enable a plurality of systems 100 to have access to the map, model, or the like. This can remove a necessity for each separate system 100 to rescan a worksite.

Additionally, maps or models generated by one or more systems 100 can be stitched together to create a larger global map or model of a room, building, site, or the like. Automated drywalling systems 100 can report discrepancies or changes to previous scans, updating the map or model and propagating such data to peer systems 100. Such maps or models can be stored on one or more of the systems 100, the drywall server 1010, the user device 1020, or the like. New scans generated by the one or more systems 100 can be incorporated into a map or model as layers or in any other suitable way, when a new task has been executed such that the system 100 has overlaying maps or models of the workspace at different steps of the process. For example, maps or models generated or used on previous days, in previous tasks, or in previous sessions can be used as a starting input for a new task allowing the system 100 to use such models or maps as starting points for navigation and/or to update the parameters of the task given the starting conditions. The systems 100 can upload their data via the network 1030 (e.g., using Bluetooth, local Wi-Fi, wireless communication systems, wired systems or the like).

The computational planner can utilize multiple systems 100 to optimize how a job is completed. For example, a planner can coordinate paths of any suitable plurality of different systems 100 to avoid collisions, high loads in a floor area, tight spaces, and/or inefficient use of resources. The planning system can break down a workspace to optimize for time to complete the job, minimum number of drywall systems, minimizing the amount of manual work, maximizing tool utilization, or the like. In some examples, a user can review a plan for the workspace and review what each system 100 will be tasked with doing. The fleet plan can be updated given new inputs from the individual systems 100 such as progress, errors or faults, a system 100 being down, user updates, work order changes, new requirements system constraints, and the like. In some examples, a user can preview how changing requirements and constraints may effect completion time, job costs, utilization, manual work, assets required, and the like.

The computational planner can utilize a user interface to enable the worker to control, program, debug, plan, setup the machines, and the like. For example, such a user interface can be part of an automated drywall system 100 a user device 1020, or other suitable device. A user interface can be used to give a user information regarding steps that can be taken to setup each automated drywall system 100 or a fleet of automated drywall systems 100. Each step can be checked off when complete and the user can request more information on each step. The workspace of one or more system 100 can be shown overlaid on a camera feed or projected onto one or more target surface to help a user position one or more automated drywalling system 100. In various embodiments, the workspace can be projected using lights, lasers, or the like. One or more system 100 can automatically perform certain steps of one or more drywalling task and the user interface can report the progress of each step, and can give guidance to the steps the user can follow to perform one or more task. The user interface can be used to setup one or more automated drywalling system 100, run calibration routines, and the like. The user interface can also be used to plan one or more drywalling task including detecting wall, user definition of path parameters or a path itself, auto generation of a tool path, user input of tool parameters, and the like. The planner can automatically optimize tool parameters, tool paths, and the like given a set of user inputs.

The user interface can be a graphical user interface and can include a 2D or 3D representation of the worksite and/or workspace. Such a representation can include camera feeds as well as computer models and reconstructions created using sensor data. The interface can overlay paths, quality visuals, progress, a robot model, and the like over the camera or workspace models. As the task is completed, the path can be highlighted in different colors or with different style lines to indicate completion, quality achieved, problem areas, and the like.

Problems, issues, bugs, and the like, can be reported in a user interface. Lights on the base unit 120, robotic arm 140, and/or end effector 160 as well as sounds, vibrations, or the like can also be used to indicate problems, system motion, that work is in progress, that the system 100 is on or off, that one or more toolpath is running or paused, that the system 100 needs attention or refill of materials, and the like. In further examples, a user interface can display information on the progress, task and tool parameters, and quality metrics of the task being performed.

Environmental conditions can also be recorded by the system 100 and can be displayed on a user interface. For example, the system 100 can indicate to a user steps to take to correct or improve environmental conditions including air quality, temperature, humidity, and the like. In some examples, if the system 100 detects unsuitable or unsafe conditions for drywalling tasks, the system 100 can display a warning to the user providing guidance on how to address such unsuitable or unsafe conditions. In various examples, the system 100 can use an optimization method to determine what parameters can be used to improve various drywalling tasks, including but not limited to, reducing work time, increasing work quality, minimizing material usage, and the like. The system 100 can generate reports and such reports can be presented on a user interface, including reports on tasks executed, quality metrics, environmental conditions, task completion, and performance logs, and the like. Information can include robot workspace, tool paths, tool parameters, task progress, sequence of approach, coating application rate(s) and/or thicknesses, spray pressure(s) and/or flow rate(s), force(s) applied by one or more tool, coverage record, path speed, tracking error, time to complete a task, tool time, setup time, vacuum waste material collected, cleaning time, and the like. In various examples, a user interface can display filter conditions, and the system 100 can trigger an alarm or instruction when a filter need to be replaced or cleaned.

A user can interface with a computational planner using a computer, tablet, touch screen, mobile device, pendant, joystick, controller, or buttons directly on the system 100 (e.g., via a drywalling server 1010, user device 1020 and/or the system 100). In some examples, a worker can also position and train the base unit 120, robotic arm 140, and/or end effector 160 by directly moving the base unit 120, robotic arm 140, and/or end effector 160. The user interface, controller, buttons, or the like, can be used to record such positions as well as to change a control mode, task, or the like.

A computational planner can leverage fleet connectivity and a global planner (e.g., via the network 1030) to share information collected on one system 100 with other systems 100 within the automated drywalling system network 1000. The planner can create paths and toolpaths based on data from one or more vision systems 324, 364 and/or sensors 326, 346, 366, job or task requirements, user inputs, and the like. Changes made by a user to a plan, task, toolpath, tool parameter, or the like, can be recorded and fed to one or more machine learning algorithms to update the planner. In one embodiment, a user can edit a toolpath to deal with a type of feature such as an opening on the wall and the planner can learn from this input and in the future automatically plan this user defined path for similar features that fit this criteria related to such features.

In some examples, an augmented reality system can be used to show a worker a toolpath plan generated by the planner, task instructions, an original BIM or model, or the like. An augmented reality display can be presented via a user device 1020 or an automated drywalling system 100 (e.g., using a headset, smart goggles, projections, and the like). For example, a worker can be shown areas that require manual coating application. In some examples, user can also overlay worksite models or maps in an augmented reality system to show the location of studs, framing, pipes, ducts, electrical system, or the like behind one or more pieces of drywall 610 to facilitate joint compound application, sanding, painting and the like. Drywall tools, both manual and automated, can be tracked in a map or model using one or more of the vision systems 324, 364 and/or sensors 326, 346, 366 (e.g., via an inertial measurement unit (IMU), tags, RFID, and the like). In some examples, a warning can be given to an operator if an attempt is made to use a tool in an erroneous position, under the wrong tool settings, and the like. The system 100 or tools can also utilize vision systems 324, 364 and/or sensors 326, 346, 366 (e.g., radar, sonar, thermal imaging, and the like) to establish what is behind pieces of drywall 610 or other substrates.

The automated planning system can also produce a visualization, paths, instructions, or the like, to guide a user in completing manual work. In some examples, a visualization can include 2D or 3D maps marking areas of work with labels. Further embodiments, a visualization can also include a projection of a plan onto a target surface, which can be done with various suitable visualization systems, including a laser system, projector, augmented reality headset or goggles worn by the user, and the like.

A computational planner for installing and/or finishing drywall can encompasses all or any of the planning steps of a drywalling process, including cutting boards of drywall 610, hanging drywall 610, and finishing drywall 610, including the walls, ceilings, and the like. The planning system can utilize job parameters such as finish quality, job timeline, materials, location of light sources, and the like, to create a plan for one or more step of a drywalling process (see, e.g., the method 500 of FIG. 5). The planner can optimize a generated plan for quality, cost, asset utilization, minimization of manual work, time to completion, facilitating manual work, or the like.

One or more of the vision systems 324, 364 and/or sensors 326, 346, 366 of the planning system 100 can be used to detect wood framing or metal furring, ducting, electrical boxes, window, door frames, and the like, which in some examples can inform where the pieces of drywall 610 will be mounted on a wall assembly 800. In some examples, the planning system can implement an optimization algorithm to determine how a room should be covered with drywall using information of available board sizes. In various examples, the computational planner can be directed to minimize various elements including the number of seams 620, wasted material, number of boards, number of butt joints, any other function defined as a cost, and the like. The planner can also use information about the room from a computer model or building information modeling (BIM) system to determine how to cover the walls and ceilings with drywall 610. The planner can have options to allow for a user to edit a proposed layout of one or more pieces of drywall 610 and/or a hanging sequence of pieces of drywall 610. In some examples, a computational planner can set a sequence for hanging drywall 610 and/or applying spray insulation such that this insulation can be applied in between sheets of drywall 610 either before one side of the wall assembly 800 is closed or through openings in elements such as drywall 610. In some examples, spray insulation, caulking, or the like can be applied after boards of drywall 610 have been hung on a wall assembly 800.

The planner can be used determine a model or map of how a room should be covered in drywall 610 and output how each board of drywall 610 should be cut to fit the model or map. Toolpaths for the system 100 generated by the planner can be used by an automated marking and/or cutting system in various embodiments. In some examples, a planner can utilize custom board pieces or sizes that are designed to enable an end effector 160 and/or or operator to hang drywall 610. In further embodiments, the planner can output tool paths for the base unit 120, robotic arm 140, and/or end effector 160 to install drywall 610 and/or to assist a user during the installation. The tool paths can include joint commands, target poses, end effector positions, and the like, to pick up drywall 610 from a pile of drywall 610, move to the target surface, rotate and position drywall 610 as required, move into position, install fasteners 640 or the like. The system 100 can also output paths for a gantry system, which can pick-up, move, position, anchor drywall 610, or the like. The planner can also output paths for the mobile base 120 to follow to deliver the materials such as drywall 610, position an end effector 160 or robotic manipulator 140, move a tool to assist the user in the hanging process, position visualization or lighting equipment, and the like. The mobile base 120 can work in coordination with a user, robotic arm 140 and/or end effector 160 to execute various drywalling tasks. A position of the mobile base 120 can be used as a rough positioning stage, with the vertical lift 126 of the base unit 120 setting a height of the robotic arm 140 and end effector 160, which can act as a fine positioning stage.

Another step in a drywalling process can include applying drywall tape 640 and/or joint compound 630 over boards of drywall 610 that have been hung on a wall assembly 800. The planner can take as an input a layout of how the boards of drywall 610 were hung by the system 100 in the room to locate seams 620 and/or the system 100 can scan the room to create an updated map or mode of the layout of drywall 610 hung in the room. The location of the framing elements (e.g., a header 810, footer 820, studs 830, or the like) type of fasteners 640 use, layout of the drywall 610 on the wall assembly 800, and the like, can provide information on the planarity, flatness of the wall, and location of high or low points.

The computational planner can then utilize a map or model uploaded to the system 100 and/or created by the automated drywall system 100 to determine tool paths and/or tool parameters for the base unit 120, robotic arm 140, and/or end effector 160 to achieve the specified joint compound application, sanding, painting, and the like for the desired finish. The planner can create toolpaths based on a global map or model of the room and can then update these paths given updated local measurements once the base unit 120, robotic arm 140, and/or end effector 160 are in place. The planner can be informed by data from vision systems 324, 364 and/or sensors 326, 346, 366 on the flatness of the wall, by user inputs, by location of seams 620 as specified by a layout planner or a scan of the room after the substrate was applied, and the like. The planner can produce toolpaths and tool parameters to enable the system 100 to apply joint compound to smooth out joints, seams, low points, high points, and other features to create a visually flat wall. Toolpaths and/or tool parameters can also be determined by a desired or required finish. For example, areas that are exposed to changing, harsh, or bright lights can receive a higher quality finish with tighter controls on tool planarity, tool overlaps, thickness and characteristics of compound applied, texture, and the like.

The planner can use joint compound application paths generated by the system 100 to inform how the surface is to be sanded, smooth or polished to achieve the desired finish. The toolpaths and tool parameters from the joint compound application performed by the system 100 can serve as inputs for the system 100 to facilitate automated sanding of the mudded drywall 610, which can enable sanding to be tuned according to the application of the joint compound 630 by the system, including features of joint compound 630 and compound characteristics such as how the joint compound 630 was dried, type, hardness, and layers of joint compound 630 applied.

In some examples, the system 100 can apply a layer or profile of joint compound 630 that is greater than a thickness that is manually applied to allow for the sanding system to sand down to a desired plane. In some examples of manual joint compound application (e.g., as shown in FIG. 6a-6e) mud 630 can profiled to taper from high points. In various examples, the system 100 can apply a thicker layer than other methods, which can enable the system 100 to sand down high points to be level to the adjacent surfaces. For example, another method of applying joint compound 630 is illustrated in FIGS. 7a and 7b.

In various examples, the planner can create toolpaths based on a global map or model of a room and then update generated toolpaths given updated local measurements once the base unit 120, robotic arm 140, and/or end effector 160 are in place. The planner can be informed by thickness measurements, data from vision systems 324, 364 and/or sensors 326, 346, 366 on the flatness of the wall, information recorded on how joint compound 630 was applied in previous steps by the system 100, user inputs, location of seams 620 as specified by a layout planner or a scan of the room by the system 100 after the drywall 610 was applied, and the like. The planner can produce toolpaths and/or tool parameters to enable the system 100 to smooth out joints, seams, low points, high points, and other features to create a visually flat wall. The toolpaths and/or tool parameters can also be determined based on a desired or required finish. For example, areas that are exposed to changing, harsh, or bright lights and areas that will be painted to a glossy finish can receive a higher quality finish with tighter controls on roughness, planarity, and tool overlaps.

The system 100 can also utilize a feedback mechanism for communicating contact, forces, gimbal displacement information, tool orientation, motor loads, finish quality, and the like to the computational planner for the purpose of real time updating of the tool paths and tool parameters for improving finish. The planning system can use tool position and orientation, captured surface conditions and models or maps to update the robotic toolpaths to ensure that the desired contact is maintained during sanding. The system 100 can also determine areas that need another mud, sanding, or painting pass; rework of mudding, sanding or painting using the system 100, or rework of mudding, sanding or painting to be done manually by the user. A user can also use a user interface (e.g., via a user device 1020) to indicate areas that the user has identified as needing rework. The planner can use this input along with other information about the previous drywalling work performed by the system 100 to create one or more new toolpaths and/or tool parameters. Both user and system feedback can be fed into a machine learning algorithm to create a better model for mudding, sanding, and/or painting future surfaces given a set of initial conditions of various drywalling tasks.

Similarly the computational planner can be used to create tool paths and tool parameters to apply a coating such as wall paper, paint 930 or joint compound 630 on the drywall. The planner can be informed by data from vision systems 324, 364 and/or sensors 326, 346, 366 on the flatness of the wall, user inputs, location of seams 620 as specified by a layout planner or a scan of the room by the system 100 after the drywall 610 was applied. The planner can produce toolpaths and tool parameters to enable the system 100 to apply paint, wall paper or other coatings to surfaces. The toolpaths and/or tool parameters can also be determined by a desired or required finish. For example, areas that are exposed to changing, harsh, or bright lights can receive a higher quality finish with tighter controls on paint thickness, overlaps, textures, or wallpaper seam location.

The planner can specify tool parameters such as nozzle size and shape, spray pressure and distance between a sprayer and target surface, speed, and the like, to create a toolpath that can cover the surface with the prescribed overlap and thickness of coating materials (e.g., joint compound 630, paint 930, adhesive, wallpaper, and the like). Changing these parameters can control the size of a spray pattern on the wall, and the planner can use this control to facilitate coverage, to increase the robot workspace or to minimize the number of cart positions required to complete a given task. Sanding overlap can also be tuned by the planner to enable a generated toolpath to cover the entire surface of drywall 610 given a defined sanding disk size. The planner can also separate tool control from base unit 120 control, robotic arm 140 control, and/or end effector 160 control, which can enable the system 100 to perform dry runs of tool paths and/or tool parameters. Such dry-runs can be used by a user to review a toolpath and/or tool parameter before treating the surface of drywall 630 with a coating. A dry-run can have an additional offset such that the tool is not in contact with the drywall 610 or joint compound 630 during the dry-run. A user interface can enable the user to change feed rates for the dry-run to speed up or slow down the tool path.

In various examples, the planner can use one or more vision systems 324, 364 and/or sensors 326, 346, 366 to establish a condition of the wall before and after application of joint compound 610, paint 930, or sanding to determine appropriate toolpaths and tool parameters. For example, in some embodiments, the system 100 can use structured lights, stereo cameras, images, lights and shadows, LIDAR, radar, sonar, point clouds or the like, to establish a condition of the surface of drywall 610. Such conditions include establishing a surface plane relative to the tool or another surface, detecting high or low points, curvature, defects, and the like. The vision systems 324, 364 and/or sensors 326, 346, 366 can be used to create a topographical map of the surface of drywall to identify high and low spots. A map or model can be created after the drywall 610 or other substrate has been hung. The map or model can also be an input from a board layout plan (e.g., generated by the system 100) that specifies the location and types of joints 620 and other features in the room. The map or model can be updated by the vision systems 324, 364 and/or sensors 326, 346, 366 as the system 100 is moved around the room. For example, the system 100 can utilize rollers, proximity sensors, contact sensors, profilometers, and the like, to measure the profile of the surface of drywall 610. The base unit 120, robotic arm 140, and/or end effector 160 can be used to make contact with rollers or other suitable mechanism on an encoded linear stage and then move such elements over the surface creating a topographical map. This can be done over joints or seams 620 to determine the profile of a surface of drywall 610. The system 100 can utilize a generated or uploaded topographical map or model to compute how paint 930 or joint compound 630 should be applied, tapered, and/or sanded to create a visually flat wall.

The automated drywalling system 100 can be instrumented with vision systems 324, 364 and/or sensors 326, 346, 366 that provide data to the planner to improve operation and ensure quality of drywalling tasks performed by the system 100. The vision systems 324, 364 and/or sensors 326, 346, 366 can be used to check that the drywall hanging process has been completed as prescribed and the system 100 can highlight any problem areas like high or low points. The system 100 can be used to check that drywall fasteners 640 (e.g., drywall screws or anchors) are spaced correctly according to a plan or code and that such fasteners 640 have been installed at the correct depths. A detailed plan showing the location of the drywall fasteners 640 (e.g., drywall screws or anchors) can be used to facilitate inspections and can be accompanied with images of each fasteners 640. The automated drywall system 100 can be used to scan the room after the drywall 610 has been hung to update a map or model to as-built conditions or create an additional layer of the map or model. The as-built map or model can be used as an input to planning of any task of a drywalling process, including indicating how joint compound 630, paint 930, or sanding should be applied to achieve the desired visual flatness and finish.

During various steps in a drywalling process, the system 100 can use data from vision systems 324, 364 and/or sensors 326, 346, 366 (e.g., force and torque sensors) to apply a desired force during troweling, taping, sanding, painting, drywall hanging, and the like. The vision systems 324, 364 and/or sensors 326, 346, 366 can monitor only force normal to a blade, rollers, sanding head, or the like, or multiple axes including torque measurements and six-axis sensing. Such force sensing can be used to control the force or pressure applied at a tool of an end effector 160. A minimum force or contact readings can also be used to ensure that sufficient contact is made before a material is allowed to flow or tool is started, with force below a certain threshold or determined loss of contact triggering the stop of material flow or turning off the tool.

The vision systems 324, 364 and/or sensors 326, 346, 366 can be used to capture where and how adhesive, joint compound 630, paint 930, or the like, has been applied. By monitoring the spray pattern applied on the wall, the system 100 can detect clogs, nozzle or blade wear, or other problems. In one example, a thermal camera can be used to detect an applied coating material, which can be at a different temperature than a target material such as drywall 610. The temperature of a coating material (e.g., joint compound 630 or paint 930) can be controlled to facilitate detection by vision systems 324, 364 and/or sensors 326, 346, 366. Monitoring the coating materials temperature can give information on the moisture content of such a coating material. For example, a coating material (e.g., joint compound 630 or paint 930) can have a prescribed coloring or additives to create contrast between the target surface and the coating material, which can facilitate the detection of areas that have been covered by the coating material and areas that have not been covered. The color can change as the coating material dries as well as after it has been sanded. The system 100 can also apply joint compounds 630 in layers with different colors to facilitate detecting how much material has been applied and removed at various locations. Data from vision systems 324, 364 and/or sensors 326, 346, 366 (e.g., capacitance, radar, resistance, humidity, conductivity, sonar measurements, or the like) can be used to establish the thickness of the coating material that has been applied to the drywall 610. In some examples, lights or other illumination systems can be mounted on the base unit 120, robotic arm 140, and/or end effector 160 or external to the system 100 to illuminate a target surface, which can enable the detection of coated surfaces, high and low points, tool marks, coating roughness, orange peel, and defects using one or more vision systems 324, 364 and/or sensors 326, 346, 366.

The planning system can monitor the coverage achieved by a tool and update tool paths and tool parameters to generate a desired coating profile applied to a surface of drywall 610. The planner can dynamically tune a sprayer fan or sprayer bell until a spray pattern matches a desired shape, thickness, size, or the like. In various examples, the system 100 can move the sprayer closer or farther away from a target surface to change a spray pattern generated by the sprayer. A coating system (e.g., sprayer of joint compound 630 or paint 930) can tune the covering material flow rate, pressure, spray tool speed, or the like, to achieve a desired thickness. The toolpaths and/or tool parameters can be updated to ensure that a desired overlap is being achieved.

The vision systems 324, 364 and/or sensors 326, 346, 366 can be used to detect a sanding finish, and using this information, the planner can establish if a sanding pad needs to be changed. A user interface can display the wear on a sanding pad and can alert a user when the disk needs to be changed. A sanding model with inputs from a sanding tool, including motor load, sanding speed, grit, material collected by the vacuum system, contact forces, tool orientation, and the like, can be used to estimate the material removed at various points.

In various embodiments, a planning system can utilize a feedback mechanism for communicating contact, forces, tool orientation, motor loads, environmental readings, finish quality, and the like to a larger robotic system (e.g., automated drywalling system network 1000 of FIG. 10) and master planner (e.g., implemented by a drywall server 1010) for the purpose of real time updating of the tool paths and tool parameters for improving finish generated by one or more automated drywalling systems 100. The systems 100 can use tool position, orientation, captured surface conditions, models, maps and the like, to update the robotic toolpaths and/or tool parameters to ensure that desired contact and forces are maintained during performance of a task by the system 100.

A computational planner can use quality monitoring to determine areas that need another coating or sanding pass, rework using the automated drywalling system 100, or rework to be done manually by a user. A user can also use a user interface to indicate areas that the user has identified as needing rework. The planner can use this input from the user interface along with other information about the previous work performed by the system 100 to create a new or revised toolpath and/or tool parameter for the system 100. User and/or system feedback can be fed into a machine learning algorithm to create a better model for sanding future surfaces, applying joint compound 630, or applying paint 930 given a set of initial conditions.

The planner can use data from one or more of the vision systems 324, 364 and/or sensors 326, 346, 366 (e.g., force and contact sensor information) to operate the system 100 in force control, where motions and speeds of the system 100 are driven to ensure a desired force is applied in desired directions or in desired locations. Similarly, force sensing can be used to detect contact with an object, obstacle, intersecting wall or ceiling, and the like. By monitoring the forces, torque, and the like on the base unit 120, robotic arm 140, and/or end effector 160 the system 100 can detect that it has made contact with an adjacent wall or ceiling and can alter a toolpath or tool parameter accordingly. In some examples, force measurements can be used to detect accidental contact and can trigger a safety operation such as stopping the system 100 or retracting the system 100 away from a determined contact point. The base unit 120, robotic arm 140, and/or end effector 160 can also use one or more of the vision systems 324, 364 and/or sensors 326, 346, 366 to detect that an end effector 160 or tool is touching a surface, obstacle, object, or worker, as well detect the distance to an adjacent surface or detect contact with that surface. The vision systems 324, 364 and/or sensors 326, 346, 366 (e.g., force, contact, displacement, or proximity sensors) can be mounted on outriggers from the base unit 120, robotic arm 140, and/or end effector 160 to sense obstacles, objects, or adjacent surfaces ahead of one or more tools of an end effector 160. The system 100 can detect, follow, and use adjacent walls as datums to guide coating application or sanding and to achieve accurate corners, and the like.

A computational planner can prescribe one or more control strategies for the base unit 120, robotic arm 140, and/or end effector 160 to complete one or more drywalling task. For example, position control can be used to command the system 100 to follow a trajectory given speed, acceleration, jerk constraints, and the like. In another example, the system 100 can be controlled at the joint level by giving commands to the joints of the base unit 120, robotic arm 140, and/or end effector 160 to achieve a desired robot state and/or tool position. In further examples, control can be done at a higher level, which can allow a user or program to control the position and orientation of an end effector 160 only. In yet another example, the system 100 can be controlled in task space where the system 100 controls a tool relative to the task. This approach can focus on achieving a desired tool position, orientation, speed, or the like relative to a target surface rather than on each joint of the base unit 120, robotic arm 140, and/or end effector 160 reaching a respective target goal. The automatic drywalling system 100 can utilize force control to control the force applied to a target surface, an obstacle, adjacent surfaces, objects, and the like. The applied force can be controlled in a single axis or multiple axes. Hybrid control modes can also be used in various embodiments. For example, the system 100 can be commanded to achieve a given position as long as a given force is not exceeded.

A computational planner can generate reports and interface with other software platforms including BIM packages, and the like. In some examples, reports can be created that can be used for inspection, certification, and the like. For example, reports can be customized to provide information required to pass a standard, test, or certification. A reporting system can also provide a live update of a current task progress, a live camera feed, and the like. This information can be used to help track asset performance and work progression. Such data can be reported to a BIM system or other software to facilitate planning of other trades, next steps, or schedule inspections or other tasks. Reports can include partial or full maps of joint compound applied and tool paths and tool parameters utilized to complete various task. In some examples, images and/or video can be recorded to facilitate quality check, for tracking of issues, and the like. The system 100 can record some or all tool parameters or tool paths used to complete one or more tasks, which can be fed to a machine learning software to enable the system 100 to learn from past work. In various examples, the reports can be used to optimize workflow and scheduling. For example, an optimization function of the system 100 can be updated to meet desired task parameters including minimizing task time, completion of the task in a part of the worksite to allow other trades to come in, minimizing cost, optimal use of assets and workforce, and the like. Reports generated by the system 100 can include information on environmental conditions present during one or more tasks and how the process of one or more tasks was changed based on the environmental conditions present during performance of the task.

In some examples, a planner can create a report that shows process parameters that were used to cover a surface of drywall, and the order of operations, and the like. Reports can include BIM, 3D and 2D maps or plans, images, video, and the like. The maps and/or models provided by the system 100 can be used to facilitate repairs and maintenance by providing a customer with the location of components behind a wall assembly 800 as well as the location of seams 620 to facilitate the removal of panels or boards of drywall 610.

After the completion of each task, updated room models or maps that reflect the as-built conditions and measurements can be used as a model or map from which subsequent drywalling steps are planned. The drywall 610 and/or fastener 640 layout generated or provided in a hanging step can serve as an input for a joint compound application plan generated by the system 100. A map of the thickness of joint compound 630 applied, with or without shrinking, can be fed into a planning system, which can plan tool paths and tool parameters for the system 100 to achieve a desired finish for sanding and/or painting. In various examples, sanding toolpaths and/or tool parameters can be used as inputs to a painting plan generated by the system 100. The computational planner can be used to create a plan for the full drywalling process including mapping a room, cutting drywall 610, hanging drywall 610, applying joint compound 630 to the drywall 610, sanding joint compound 630 on drywall 610, painting drywall 610, and the like. In further examples, the planning system can be used to create tool paths and/or tool parameters for treating surfaces other than drywall 610 including but not limited to cement, polymers, metals, stucco surfaces, and the like. The system 100 can plan how to apply coatings on drywall 610, boards, lath, mesh, or other suitable substrates. The system 100 can also be used to create paths for sanding, polishing, or smoothing surfaces.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. An automated drywalling system network comprising:
one or more automated drywalling systems that each comprise a positioning stage;
a first network communications device to communicate with the one or more automated drywalling systems within a network; and
a computing device comprising a second network communication device that allows the computing device to communicate with the one or more automated drywalling systems, the computing device executing a computational planner that:
generates instructions for the one or more automated drywalling systems to perform two or more drywalling tasks associated with a target wall assembly, the two or more drywalling tasks including:
a sanding task that includes sanding specific areas of joint compound applied to pieces of drywall hung on studs of the target wall assembly, with the specific areas being at least associated in part with a mudding task, the sanding task being based at least in part on a plan for a configuration of a plurality of drywall pieces to be disposed on studs of the target wall assembly, and based at least in part on determining that the joint compound is dried or cured; and
a painting task that includes painting at least sanded portions of the specific areas of the joint compound applied to the pieces of drywall hung on studs of the target wall assembly;
wherein said computing device is configured to:
communicate with each automated drywalling system to coordinate at least said sanding task and painting task; and
communicate data to cause the automated drywalling system to perform at least said sanding task and painting task.

2. The automated drywalling system network of claim 1, wherein the computing device is further configured to:
receive thickness measurements of the applied joint compound from a first automated drywalling system of the one or more automated drywalling systems that performed the mudding task; and
generate, based on the thickness measurements of the applied joint compound, a toolpath and tool parameters for a second automated drywalling system of the one or more automated drywalling systems to perform the sanding task.

3. A networked automated drywalling system comprising:
one or more automated drywalling systems that each comprise a positioning stage;
a computing device that communicates with the one or more automated drywalling systems to coordinate a plurality of drywalling tasks and to cause the one or more automated drywalling systems to perform the plurality of drywalling tasks, the computing device executing a computational planner that:
generates instructions for the one or more automated drywalling systems to perform the plurality of drywalling tasks associated with a target wall assembly based on a determination that drywall mud applied to specific areas of pieces of drywall hung on studs of the target wall assembly has dried or cured, the plurality of drywalling tasks including:
a first drywalling task that includes performing the first drywalling task on the specific areas of the pieces of drywall hung on studs of the target wall assembly, with the specific areas being based at least in part on a configuration of a plurality of drywall pieces disposed on or to be disposed on studs of the target wall assembly, the first drywalling task including a mudding drywalling task; and
a second drywalling task that includes performing the second drywalling task on at least the specific areas of pieces of drywall hung on studs of the target wall assembly, the second drywalling task performed after the first drywalling task and including work performed on at least material previously applied to the specific areas of pieces of drywall.

4. The networked automated drywalling system of claim 3,
wherein the second drywalling task includes at least one of a sanding drywalling task and a painting drywalling task.

5. The networked automated drywalling system of claim 3, wherein the mudding drywalling task comprises applying drywall mud to the specific areas of the pieces of drywall hung on studs of the target wall assembly.

6. The networked automated drywalling system of claim 4, wherein the sanding drywalling task comprises sanding drywall mud applied to the specific areas of the pieces of drywall hung on studs of the target wall assembly.

7. The networked automated drywalling system of claim 4, wherein the painting drywalling task comprises painting the pieces of drywall hung on studs of the target wall assembly including painting drywall mud applied to the specific areas of the pieces of drywall hung on studs of the target wall assembly.

8. The networked automated drywalling system of claim 3,
wherein a first automated drywalling system of the one or more automated drywalling systems performs the first drywalling task, and
wherein a second automated drywalling system of the one or more automated drywalling systems performs the second drywalling task.

9. The networked automated drywalling system of claim 3, wherein the generation of instructions for at least one of the first and second drywalling tasks is further based on hanging data generated by a first automated drywalling system of the one or more automated drywalling systems, the hanging data generated while the first automated drywalling system performs hanging the pieces of drywall on the studs of the target wall assembly.

10. The networked automated drywalling system of claim 9, wherein the generation of instructions for the second drywalling task is further based on first drywalling task data generated by at least one of the one or more automated drywalling systems of the one or more automated drywalling systems, the first drywalling task data generated while the at least one of the one or more automated drywalling systems performs the first drywalling task on the specific areas of the pieces of drywall hung on the studs of the target wall assembly.

11. The networked automated drywalling system of claim 3, wherein
generation of the instructions for at least one of the first and second drywalling tasks is further based on job parameters including one or more of: location of light sources, desired finish quality of a target wall assembly, and job schedule; and
wherein generation of the instructions for at least one of the first and second drywalling tasks further comprises an optimization method to optimize at least one of the first and second drywalling tasks, the optimization method including at least one of: reducing work time, increasing work quality, maximizing drywalling system utilization, minimizing total job cost and minimizing material usage when performing at least one of the first and second drywalling tasks.

12. The networked automated drywalling system of claim 3, wherein the instructions to perform the first drywalling task and the second drywalling task are each respectively updated in real-time based on real-time measurements obtained during and associated with respective performance of the first drywalling task and the second drywalling task.

13. The networked automated drywalling system of claim 3, wherein the instructions to perform the first drywalling task and the second drywalling task are each respectively updated based on environmental condition measurements obtained by one or more environmental condition sensors of the one or more automated drywalling systems.

14. The networked automated drywalling system of claim 3, wherein
the instructions to perform the first drywalling task and the second drywalling task are each respectively generated based on identified features of a wall assembly identified by at least one automated drywalling system, and
wherein the first drywalling task and the second drywalling task include one or more of:
avoiding identified features including obstacles or openings;
changing an amount of material added or removed from the target wall assembly based on an identified feature of the target wall assembly; and
selecting an alternative toolpath based on the identified feature of the target wall assembly.

15. The networked automated drywalling system of claim 3, wherein the computational planner further obtains a virtual map of a physical wall assembly and wherein the virtual map is used as a reference for location of at least one automated drywalling system of the plurality of automated drywalling systems relative to the physical wall assembly.

16. A drywalling networked computing device that communicates with one or more drywalling systems of a worksite to coordinate drywalling tasks and to cause the one or more drywalling systems to perform the drywalling tasks of a drywalling process, the drywalling network computing device executing a computational planner that:
receives information about the drywalling tasks from the one or more drywalling systems, based on the received information about the drywalling tasks, determines a plan comprising a map of the worksite, a configuration of a plurality of drywall pieces hung on studs of a target wall assembly, and the drywalling process; and
generates instructions for each one of the one or more drywalling systems to perform the drywalling tasks associated with a target wall assembly based on the plan, the drywalling tasks includes:
a first drywalling task that includes performing the first drywalling task according to the plan on specific areas of pieces of drywall hung on studs of the target wall assembly, with the specific areas being based at least in part on a configuration of a plurality of drywall pieces disposed on studs of the target wall assembly; and
a second drywalling task that includes performing the second drywalling task according to the plan on at least the specific areas of pieces of drywall hung on studs of the target wall assembly, the second drywalling task performed after the first drywalling task according to the plan and including work performed on at least material previously applied to the specific areas of pieces of drywall.

17. The drywalling networked computing device of claim 16,
wherein the first drywalling task includes one of a mudding drywalling task and a sanding drywalling task;
wherein the second drywalling task includes at least one of the sanding drywalling task and a painting drywalling task in a first case where the first drywalling task includes the mudding drywalling task; and
wherein the second drywalling task includes the painting drywalling task in a second case where the first drywalling task includes the sanding drywalling task.

18. The drywalling networked computing device of claim 16,
wherein a first drywalling system of the one or more drywalling systems performs the first drywalling task, and
wherein a second drywalling system of the one or more drywalling systems performs the second drywalling task.

19. The drywalling networked computing device of claim 16, wherein the generation of instructions for at least the first drywalling task is further based on hanging data generated by at least one of the drywalling network computing device and the one or more drywalling systems.

20. The drywalling networked computing device of claim 16, wherein the drywalling network computing device further generates a report of work completed including the first and second drywalling tasks, the report including an indication of a quality achieved by the performed first and second drywalling task.

* * * * *